US012803480B2

(12) United States Patent
Mori et al.

(10) Patent No.: US 12,803,480 B2
(45) Date of Patent: Nov. 17, 2026

(54) CONTROL DEVICE FOR AC ROTATING MACHINE, AND ELECTRIC POWER-STEERING DEVICE

(71) Applicant: Mitsubishi Electric Corporation, Tokyo (JP)

(72) Inventors: Tatsuya Mori, Tokyo (JP); Kenta Sawada, Tokyo (JP); Chiaki Fujimoto, Tokyo (JP); Hirotaka Nakaya, Tokyo (JP); Kosuke Ishikawa, Tokyo (JP); Shingo Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 202 days.

(21) Appl. No.: 18/841,071

(22) PCT Filed: Mar. 16, 2022

(86) PCT No.: PCT/JP2022/011916
§ 371 (c)(1),
(2) Date: Aug. 23, 2024

(87) PCT Pub. No.: WO2023/175774
PCT Pub. Date: Sep. 21, 2023

(65) Prior Publication Data

US 2025/0202394 A1 Jun. 19, 2025

(51) Int. Cl.

*H02P 21/22* (2016.01)
*B62D 5/04* (2006.01)
*H02P 27/08* (2006.01)

(52) U.S. Cl.
CPC .............. *H02P 21/22* (2016.02); *B62D 5/046* (2013.01); *H02P 27/08* (2013.01)

(58) Field of Classification Search
CPC ........ H02P 21/22; H02P 27/08; H02P 29/027; B62D 5/046
(Continued)

(56) References Cited

U.S. PATENT DOCUMENTS 7,489,099 B2 * 2/2009 Fujiwara ................ H02P 27/04 318/609
10,027,260 B2 * 7/2018 Fujii ....................... H02P 21/22
11,152,881 B2 * 10/2021 Tsuchimoto ........ H02P 21/0089

FOREIGN PATENT DOCUMENTS

JP 2007-274863 A 10/2007
JP 2009-189146 A 8/2009
JP 2010-119245 A 5/2010

OTHER PUBLICATIONS

Extended European Search Report dated Mar. 20, 2025 in European Patent Application No. 22932053.6.
(Continued)

*Primary Examiner* — David Luo
(74) *Attorney, Agent, or Firm* — Sughrue Mion, PLLC

(57) ABSTRACT

A control device for an AC rotating machine includes: an inverter; an electric current detector; a first axis voltage command value calculator configured to calculate a voltage command value of a first axis between two rotational axes; and a second axis voltage command value calculator configured to calculate a voltage command value of a second axis between the two rotational axes. The first axis voltage command value calculator includes a gain changer configured to change a set value of a gain based on a detected electric current value of the first axis or a first deviation, performs integral calculation using an integral input calculated based on the gain and a second deviation, and calculates the voltage command value of the first axis based on a result of the integral calculation.

13 Claims, 19 Drawing Sheets

(58) Field of Classification Search
USPC .......................................... 318/798, 767, 727
See application file for complete search history.

(56) References Cited

OTHER PUBLICATIONS

Communication dated Apr. 22, 2025 in Japanese Application No. 2024-507297.
International Search Report for PCT/JP2022/011916 dated May 24, 2022.

* cited by examiner

CONTROL DEVICE FOR AC ROTATING MACHINE, AND ELECTRIC POWER-STEERING DEVICE

CROSS REFERENCE TO RELATED APPLICATIONS

This application is a National Stage of International Application No. PCT/JP2022/011916 filed Mar. 16, 2022.

TECHNICAL FIELD

The present disclosure relates to a control device for an alternating current (AC) rotating machine, and an electric power-steering device.

BACKGROUND ART

Patent Document 1 discloses technology related to so-called non-interference control for compensating for interference terms on two rotational axes (for example, d- and q-axes) in vector control for an AC rotating machine.

Specifically, in FIG. 2 of Patent Document 1, an interference component (vd_i, vq_i) is calculated based on an electric current command value (Id*, Iq*), the number of interlinked magnetic fluxes $\phi$, and an angular velocity $\omega$. That is, for the calculation of the interference component, an induced voltage term ($\omega\times\phi$) is considered. The control based on this calculation is not based on a deviation between the electric current command value and an electric current (Id, Iq), so it corresponds to so-called feedforward control.

In contrast, in FIG. 3 of Patent Document 1, an interference error correction voltage (vd_c, vq_c) is calculated based on a deviation between the electric current command value (Id*, Iq*) and the electric current (Id, Iq). The control based on this calculation is based on a deviation between the electric current command value and the electric current, so it corresponds to so-called feedback control.

CITATION LIST

Patent Document

[Patent Document 1]
Japanese Unexamined Patent Application, First Publication No. 2010-119245

SUMMARY OF INVENTION

Problem to be Solved by the Invention

In the disclosure of Patent Document 1, compensation for the induced voltage term ($\omega\times\phi$) is performed only in the feedforward control, and compensation in the feedback control is not performed. In the induced voltage term ($\omega\times\phi$), the angular velocity $\omega$ is obtained by performing calculation (differential or difference) based on a signal indicating the rotor position of the AC rotating machine. Here, noise contained in the signal indicating the rotor position may appear as a high-frequency component with the angular velocity $\omega$. As a countermeasure against it, when non-interference control is performed using a result when the angular velocity $\omega$ is made to pass through a low-pass filter, interference compensation may not be properly performed due to a response delay in the low-pass filter. In particular, when the angular velocity $\omega$ rapidly decreases, the induced voltage term ($\omega\times\phi$) in interference compensation should rapidly decreases, but the response delay in the low-pass filter may cause the excess of the electric current (Id, Iq).

Moreover, the actual numerical value of the number of interlinked magnetic fluxes $\phi$ changes due to the temperature of the magnet of the rotor in addition to the variation in the manufacture of the AC rotating machine. Therefore, a difference occurs between the numerical value of the number of interlinked magnetic fluxes $\phi$ acquired by a control device and the actual numerical value thereof. Due to this difference, if non-interference compensation is not properly performed, the accuracy of the control may deteriorate and the overcurrent may be caused.

The present disclosure has been made in view of the above circumstances, and an objective thereof is to provide a control device for an AC rotating machine, and an electric power-steering device capable of suppressing the occurrence of an overcurrent due to a change in an induced voltage.

Means to Solve the Problem

In order to achieve the aforementioned objective, a control device for an AC rotating machine according to an aspect of the present disclosure includes: an inverter configured to apply a voltage to the AC rotating machine; an electric current detector configured to detect a rotating machine electric current flowing through the AC rotating machine; a first axis voltage command value calculator configured to calculate a voltage command value of a first axis between two rotational axes of the AC rotating machine; and a second axis voltage command value calculator configured to calculate a voltage command value of a second axis between the two rotational axes, wherein the first axis voltage command value calculator includes a gain changer configured to change a set value of a gain based on a detected electric current value of the first axis or a first deviation that is a deviation between an electric current command value of the first axis and the detected electric current value of the first axis, and wherein the first axis voltage command value calculator performs integral calculation using an integral input calculated based on the gain and a second deviation that is a deviation between an electric current command value of the second axis and a detected electric current value of the second axis and calculates the voltage command value of the first axis based on a result of the integral calculation.

Moreover, an electric power-steering device according to an aspect of the present disclosure includes: the control device according to the above aspect; the AC rotating machine; and a driving force transmission mechanism configured to transmit a driving force of the AC rotating machine to a steering system of a vehicle.

Effects of the Invention

According to the present disclosure, a control device for an AC rotating machine, and an electric power-steering device capable of suppressing the occurrence of an overcurrent due to a change in an induced voltage can be provided.

DESCRIPTION OF EMBODIMENTS

Hereinafter, a control device for a rotating machine and an electric power-steering device according to the present disclosure will be described in detail with reference to the drawings.

Embodiment 1

Figure 1:
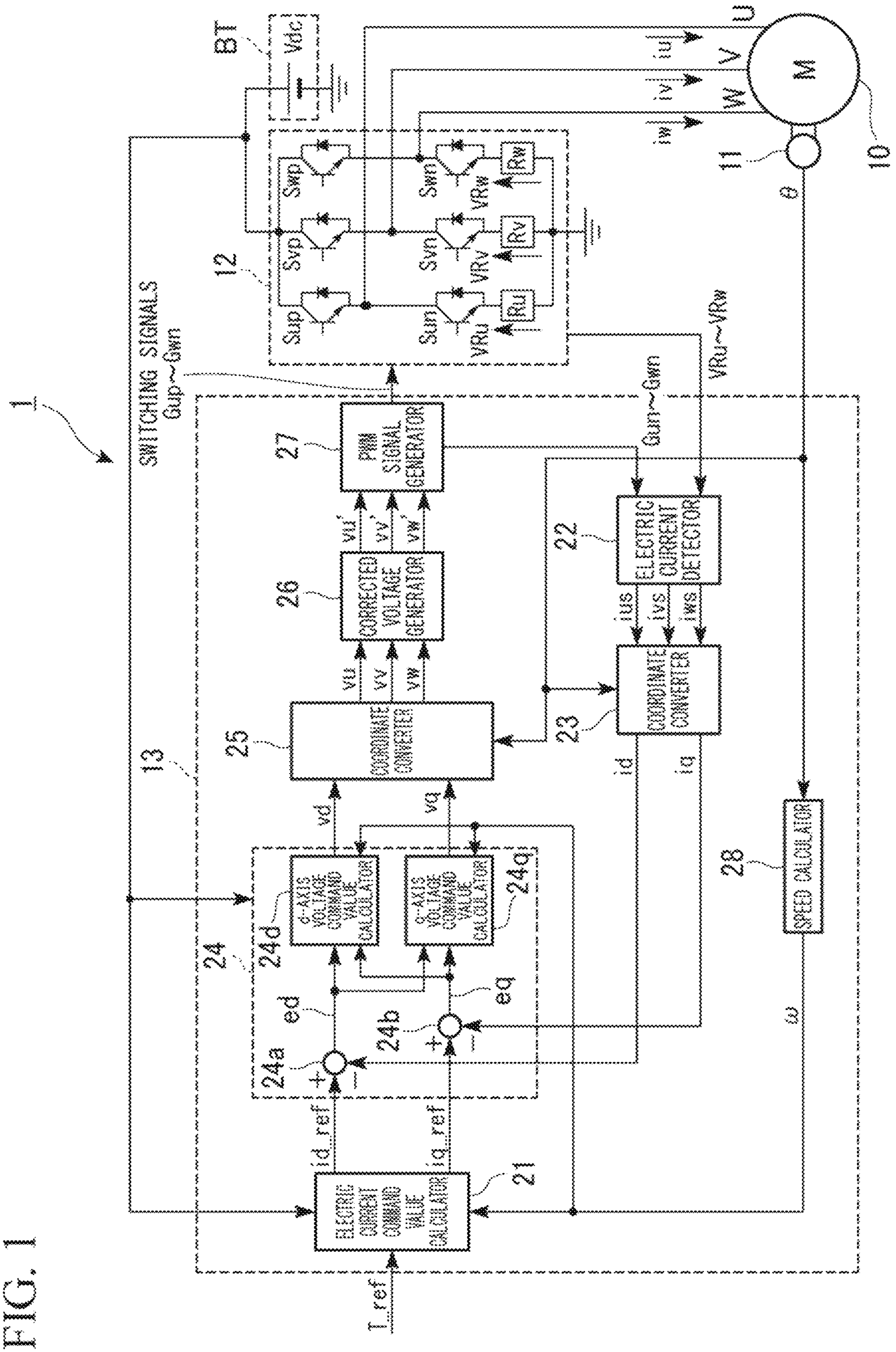
FIG. 1 is a block diagram showing a schematic configuration of a control device of a rotating machine according to Embodiment 1.

FIG. 1 is a block diagram showing a schematic configuration of a control device for a rotating machine according to Embodiment 1. As shown in FIG. 1, a control device 1 includes a rotor position detector 11, an inverter 12, and a controller 13. The control device 1 controls a rotating machine 10 based on a torque command T_ref serving as a control command input from the outside of the control device 1.

The rotating machine 10 is a three-phase AC rotating machine having three-phase windings U, V, and W. Moreover, the rotating machine 10 is an AC rotating machine that can be controlled based on two rotational axes. In the present specification, the "two rotational axes" refer to two axes that rotate synchronously with the rotor of the rotating machine 10 and that are orthogonal to each other in a lateral cross-section. The "lateral cross-section" is a cross-section perpendicular to the central axis of the rotor. For example, the two rotational axes may be d- and q-axes. The d-axis is an axis that connects the central axis of the rotor and a magnetic pole. The q-axis is an axis orthogonal to both the d-axis and the central axis. Moreover, the two rotational axes may be γ- and δ-axes. The γ-axis is an axis that is shifted in a rotational direction with respect to the d-axis. The δ-axis is an axis orthogonal to both the γ-axis and the central axis. Either one of the two rotational axes is referred to as a first axis, and the other is referred to as a second axis. For example, when the d-axis is referred to as the first axis, the q-axis is referred to as the second axis. The q-axis may be the first axis, and the d-axis may be the second axis. Likewise, when the γ-axis is referred to as the first axis, the δ-axis may be referred to as the second axis.

Hereinafter, a case where the rotating machine 10 is a permanent magnet synchronous rotating machine and the two rotational axes are the d- and q-axes will be described. However, the rotating machine 10 may be, for example, a winding field synchronous rotating machine, an induction rotating machine, a synchronous reluctance motor, or the like. Moreover, the d-axis and the q-axis in the following disclosure content may be replaced with the δ-axis and the γ-axis.

The rotor position detector 11 includes a resolver, an encoder, a magnetoresistive (MR) sensor, and the like, and uses these to detect a rotor position θ. The rotor position θ is a position of the rotor provided in the rotating machine 10 in the rotational direction. In the present embodiment, the rotor position θ of the rotating machine 10 is detected by using the rotor position detector 11. However, a configuration for estimating the rotor position θ of the rotating machine 10 without using the rotor position detector 11 can also be adopted. That is, in the present disclosure, the control device 1 may not include the rotor position detector 11.

The inverter 12 is a power converter that applies a voltage to the rotating machine 10. Specifically, under the control of the controller 13, the inverter 12 converts direct current (DC) power supplied from a DC power supply BT into AC power and supplies the AC power obtained in the conversion process to the rotating machine 10. The DC power supply BT includes, in addition to a battery, equipment for supplying DC power, such as a DC-DC converter, a diode rectifier, and a PWM rectifier. In the present specification, the output voltage (DC bus voltage) of the DC power supply BT is denoted by Vdc.

The inverter 12 includes upper arm-switching elements Sup, Svp, and Swp, lower arm-switching elements Sun, Svn, and Swn, and shunt resistors Ru, Rv, and Rw. The upper arm-switching elements Sup, Svp, and Swp are connected to the positive electrode of the DC power supply BT. The lower arm-switching elements Sun, Svn, and Swn are connected to the upper arm-switching elements Sup, Svp, and Swp, respectively, and are connected to the negative electrode of the DC power supply BT via the shunt resistors Ru, Rv, and Rw, respectively.

Here, a U-phase series circuit is formed of the upper arm-switching element Sup, the lower arm-switching element Sun, and the shunt resistor Ru. In this U-phase series circuit, the connection point between the upper arm-switching element Sup and the lower arm-switching element Sun is connected to the winding U of the rotating machine 10.

Moreover, a V-phase series circuit is formed of the upper arm-switching element Svp, the lower arm-switching element Svn, and the shunt resistor Rv. In this V-phase series circuit, the connection point between the upper arm-switching element Svp and the lower arm-switching element Svn is connected to the winding V of the rotating machine 10.

Moreover, a W-phase series circuit is formed of the upper arm-switching element Swp, the lower arm-switching element Swn, and the shunt resistor Rw. In this W-phase series circuit, the connection point between the upper arm-switching element Swp and the lower arm-switching element Swn is connected to the winding W of the rotating machine 10.

For the upper arm-switching elements Sup, Svp, and Swp and the lower arm-switching elements Sun, Svn, and Swn, semiconductor switches such as an insulated gate bipolar transistor (IGBT), a bipolar transistor, and a metal-oxide-semiconductor field effect transistor (MOSFET) can be used.

Switching signals Gup, Gvp, and Gwp output from the controller 13 are input to the upper arm-switching elements Sup, Svp, and Swp, respectively. Switching signals Gun, Gvn, and Gwn output from the controller 13 are input to the lower arm-switching elements Sun, Svn, and Swn, respectively. The upper arm-switching elements Sup, Svp, and Swp and the lower arm-switching elements Sun, Svn, and Swn are turned on or off by the switching signals Gup, Gvp, Gwp, Gun, Gvn, and Gwn output from the controller 13. In the present specification and drawings, the switching signals Gup, Gvp, Gwp, Gun, Gvn, and Gwn may be collectively referred to as "switching signals Gup to Gwn."

For example, the upper arm-switching element Sup is in an ON state when the switching signal Gup is "ON command (=1)," and the upper arm-switching element Sup is in an OFF state when the switching signal Gup is "OFF command (=0)." The same is true for other switching elements (the upper arm-switching elements Svp and Swp and the lower arm-switching elements Sun, Svn, and Swn). In this way, the inverter 12 generates, from the DC power supplied by the DC power supply BT, AC power to be supplied to the rotating machine 10.

The shunt resistors Ru, Rv, and Rw are resistance elements for electric current detection.

The shunt resistor Ru outputs, to the controller 13, a voltage VRu (=−Ru×iu) between both ends thereof proportional to an electric current (rotating machine electric current) iu flowing through the winding U of the rotating machine 10. The shunt resistor Rv outputs, to the controller 13, a voltage VRv (=−Rv×iv) between both ends thereof proportional to an electric current (rotating machine electric current) iv flowing through the winding V of the rotating machine 10. The shunt resistor Rw outputs, to the controller 13, a voltage VRw (=−Rw×iw) between both ends thereof proportional to an electric current (rotating machine electric current) iw flowing through the winding W of the rotating machine 10. In the present specification and drawings, the voltages VRu, VRv, and VRw between both ends may be collectively referred to as "both-end voltages VRu to VRw."

Here, the both-end voltages VRu, VRv, and VRw are values obtained by multiplying the rotating machine electric currents iu, iv, and iw by the resistance values of the shunt resistors Ru, Rv, and Rw, and are quantities proportional to the electric currents iu, iv, and iw. For this reason, it can be said that the both-end voltages VRu, VRv, and VRw are values obtained by detecting electric currents (detected values of the rotating machine electric currents).

Furthermore, the inverter 12 may be integrated into the rotating machine 10. The integrated inverter 12 and the rotating machine 10 are referred to as a power pack.

The controller 13 uses, as input values, the torque command T_ref, the both-end voltages VRu, VRv, and VRw, and the rotor position θ and generates the switching signals Gup to Gwn for driving the inverter 12 based thereon. The controller 13 is a PWM controller implemented by a discrete-time calculator such as a microcomputer or a digital signal processor (DSP). The controller 13 includes an electric current command value calculator 21, an electric current detector 22, a coordinate converter 23 (detection coordinate converter), a voltage command value calculation unit 24, a coordinate converter 25 (control coordinate converter), a corrected voltage generator 26, a PWM signal generator 27, and a speed calculator 28.

The speed calculator 28 obtains a rotational angular velocity ω of the rotating machine 10 by performing differential calculation or difference calculation on the rotor position θ. The speed calculator 28 inputs the obtained rotational angular velocity ω to a d-axis voltage command value calculator **24*d* and a q-axis voltage command value calculator 24*q* of the voltage command value calculation unit 24 in addition to the electric current command value calculator 21**.

The electric current command value calculator 21 calculates electric current command values id_ref and iq_ref based on the torque command T_ref, the DC bus voltage Vdc, and the rotational angular velocity ω. The electric current command values id_ref and iq_ref are command values (target values) of the electric current to flow through the rotating machine 10. id_ref also denotes a "weak field current command value," and iq_ref also denotes a "torque current command value." As the calculation method executed by the electric current command value calculator 21, maximum torque per ampere (MTPA) control, maximum torque per voltage (MTPV) control, and weak magnetic flux control which are well known may be used in an appropriate combination for each operation range (a range of speed-torque characteristics). Also, the rotational angular velocity ω may be converted into the rotational speed of the rotor, and each control process may be performed using the rotational speed.

Next, the PWM signal generator 27 will be described. The PWM signal generator 27 outputs pulse width modulation (PWM) modulated switching signals Gup to Gwn based on corrected voltage command values vu', vv', and vw' output from the corrected voltage generator 26. The corrected voltage command values vu', vv', and vw' will be described below.

Figure 2:
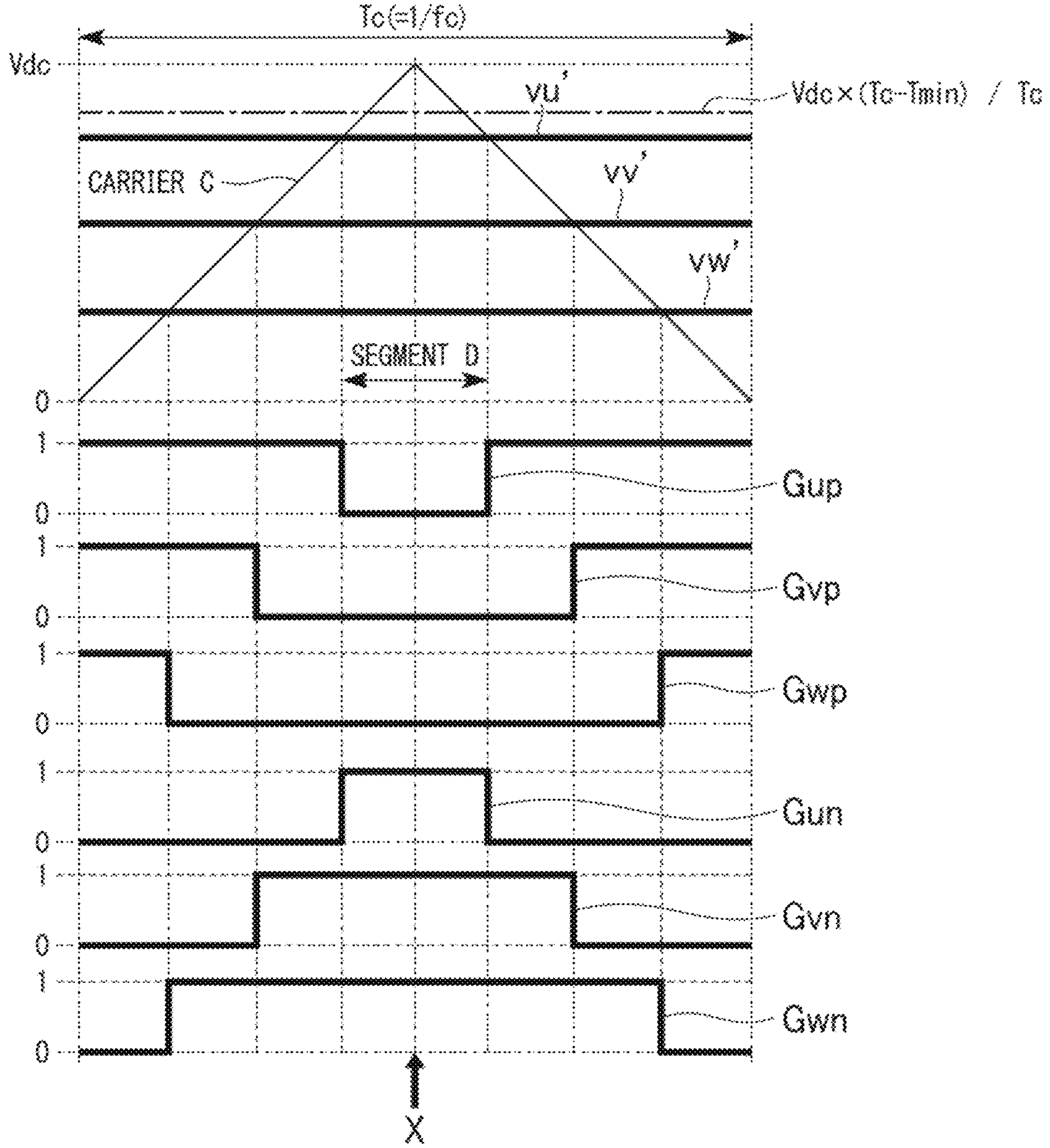
FIG. 2 is a diagram for showing a switching signal generation principle in Embodiment 1.

FIG. 2 is a diagram for showing a switching signal generation principle in Embodiment 1. The PWM signal generator 27 generates the switching signals Gup to Gwn by comparing the corrected voltage command values vu', vv', and vw' with a carrier triangle wave (carrier) C having a period Tc (frequency fc). The corrected voltage command values vu', vv', and vw' correspond to the U-phase, the V-phase, and the W-phase, respectively.

Specifically, the PWM signal generator 27 turns on the switching signal Gup ("1") and turns off the switching signal Gun ("0") if the corrected voltage command value vu' is greater than the carrier triangle wave C. In contrast, the PWM signal generator 27 turns off the switching signal Gup ("0") and turns on the switching signal Gun ("1") if the corrected voltage command value vu' is less than the carrier triangle wave C.

Moreover, the PWM signal generator 27 turns on the switching signal Gvp ("1") and turns off the switching signal Gvn ("0") if the corrected voltage command value vv' is greater than the carrier triangle wave C. In contrast, the PWM signal generator 27 turns off the switching signal Gvp ("0") and turns on the switching signal Gvn ("1") if the corrected voltage command value vv' is less than the carrier triangle wave C.

Moreover, the PWM signal generator 27 turns on the switching signal Gwp ("1") and turns off the switching signal Gwn ("0") if the corrected voltage command value vw' is greater than the carrier triangle wave C. In contrast, the PWM signal generator 27 turns off the switching signal Gwp ("0") and turns on the switching signal Gwn ("1") if the corrected voltage command value vw' is less than the carrier triangle wave C.

Further, a short circuit prevention time (dead time) may be provided in the switching signals Gup to Gwn such that the upper arm-switching elements Sup, Svp, and Swp and the lower arm-switching elements Sun, Svn, and Swn of the inverter 12 are not turned on at the same time.

The switching signals Gup to Gwn include a pattern in which all of the lower arm-switching elements Sun, Svn, and Swn are turned on during one period of the electric angle of the rotating machine 10. Specifically, a segment D shown in FIG. 2 has a pattern in which all of the switching signals Gun, Gvn, and Gwn are turned on (1).

Here, the PWM modulated voltage applied from the inverter 12 to the rotating machine 10 includes components of integer multiples of the period Tc of the carrier triangle wave C in addition to components of the corrected voltage command values vu', vv', and vw'. As a result, an electric current of a component of an integer multiple of the period Tc is caused to pass through the rotating machine 10, and the rotating machine 10 may make abnormal noise according to a value of the period Tc.

In order to prevent the occurrence of such abnormal noise, for example, when the rotating machine 10 is used as a motor that performs the steering assist of electric power steering, it is only necessary to set the period Tc of the carrier triangle wave C to 60 [μs] or less. By setting Tc=60 [μs], an abnormal noise frequency fc (=1/Tc) becomes 16.6 kHz, and it is less likely to become noise that humans find unpleasant. More preferably, it is only necessary to set the period Tc of the carrier triangle wave C to about 50 [μs]. By setting Tc=50 [μs], the abnormal noise frequency fc (=1/Tc) becomes about 20 kHz, which is substantially inaudible to humans. A frequency range audible to humans is approximately 20 Hz to 20 kHz. Hereinafter, the case of Tc=50 [μs] will be described.

Next, the electric current detector 22 shown in FIG. 1 will be described. The electric current detector 22 outputs pre-conversion detected electric currents ius, ivs, and iws using the voltages VRu, VRv, and VRw between both ends of the shunt resistors Ru, Rv, and Rw and the switching signals Gup to Gwn output from the PWM signal generator 27. Specifically, the electric current detector 22 acquires the voltages VRu, VRv, and VRw between both ends of the shunt resistors Ru, Rv, and Rw at a timing "X" shown in FIG. 2. The timing "X" is a timing at which the carrier triangle wave C has a maximum value (the DC bus voltage Vdc).

At the timing "X," as shown in FIG. 2, the switching signals Gun, Gvn, and Gwn input to the lower arm-switching elements Sun, Svn, and Swn are all ON ("1"). Thus, the electric current detector 22 acquires values of the pre-conversion detected electric currents ius, ivs, and iws by dividing the voltages VRu, VRv, and VRw between both ends of the shunt resistors Ru, Rv, and Rw by −Ru, −Rv, and −Rw, respectively.

The coordinate converter 23 performs coordinate conversion based on the pre-conversion detected electric currents ius, ivs, and iws detected by the electric current detector 22 and the rotor position θ detected by the rotor position detector 11. Thereby, the coordinate converter 23 calculates detected electric current values id and iq on the two rotational axes (the d- and q-axes). Moreover, the coordinate converter 23 inputs calculation results (detected electric current values id and iq after coordinate conversion) to the voltage command value calculation unit 24.

The voltage command value calculation unit 24 calculates voltage command values vd and vq on the two rotational axes (the d- and q-axes) based on the electric current command values id_ref and iq_ref calculated by the electric current command value calculator 21, the detected electric current values id and iq, the rotational angular velocity ω, and the DC bus voltage Vdc.

Hereinafter, the voltage command value calculation unit 24 will be described in detail.

The voltage command value calculation unit 24 includes a first deviation calculator **24*a*, a second deviation calculator 24*b*, the d-axis voltage command value calculator 24*d*, and the q-axis voltage command value calculator 24*q***.

The first deviation calculator **24*a* calculates a d-axis electric current deviation ed that is a deviation between a d-axis electric current command value id_ref and a detected d-axis electric current value id. The second deviation calculator 24*b* calculates a q-axis electric current deviation eq that is a deviation between a q-axis electric current command value iq_ref and a detected q-axis electric current value iq. The value of the d-axis electric current deviation ed calculated by the first deviation calculator 24*a* is input to the d-axis voltage command value calculator 24*d* and the q-axis voltage command value calculator 24*q*. The value of the q-axis electric current deviation eq calculated by the second deviation calculator 24*b* is input to the d-axis voltage command value calculator 24*d* and the q-axis voltage command value calculator 24*q***.

The d-axis voltage command value calculator **24*d* calculates a d-axis voltage command value vd using the d-axis electric current deviation ed, the q-axis electric current deviation eq, the DC bus voltage Vdc, and the rotational angular velocity ω. The q-axis voltage command value calculator 24*q*** calculates a q-axis voltage command value vq using the q-axis electric current deviation eq, the d-axis electric current deviation ed, the DC bus voltage Vdc, and the rotational angular velocity ω.

In the present specification, the deviation between the electric current command value and the detected electric current value on the first axis of the two rotational axes may be referred to as a first deviation. Likewise, the deviation between the electric current command value and the detected electric current value on the second axis of the two rotational axes may be referred to as a second deviation. For example, when the d-axis is the first axis, the d-axis electric current deviation ed, which is the deviation between the electric current command value id_ref on the d-axis and the detected d-axis electric current value id, is the "first deviation," and the q-axis electric current deviation eq is the "second deviation." Likewise, when the q-axis is the first axis, the q-axis electric current deviation eq is the "first deviation," and the d-axis electric current deviation ed is the "second deviation."

Figure 3:
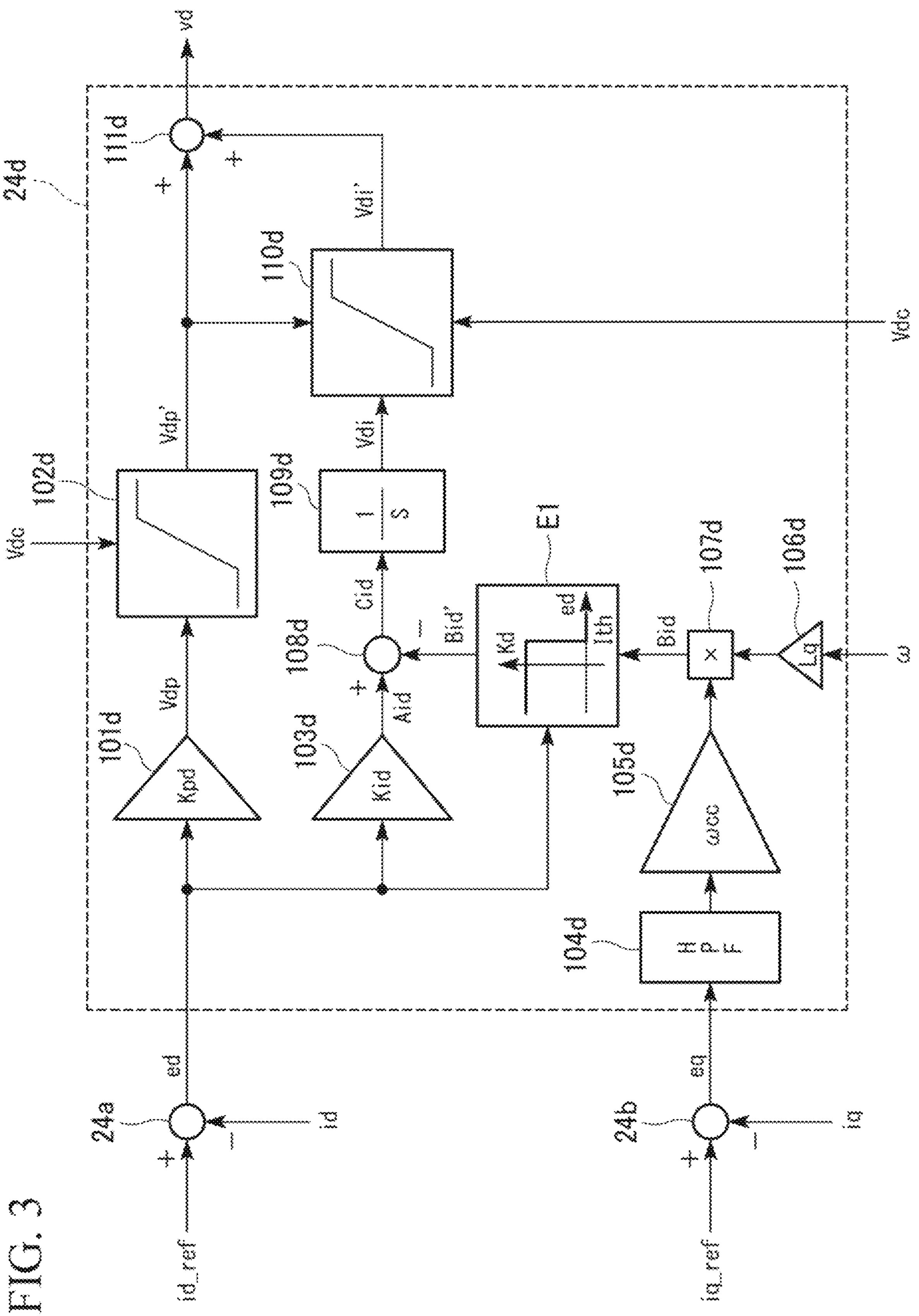
FIG. 3 is a block diagram showing a configuration of a d-axis voltage command value calculator of FIG. 1.
Figure 4:
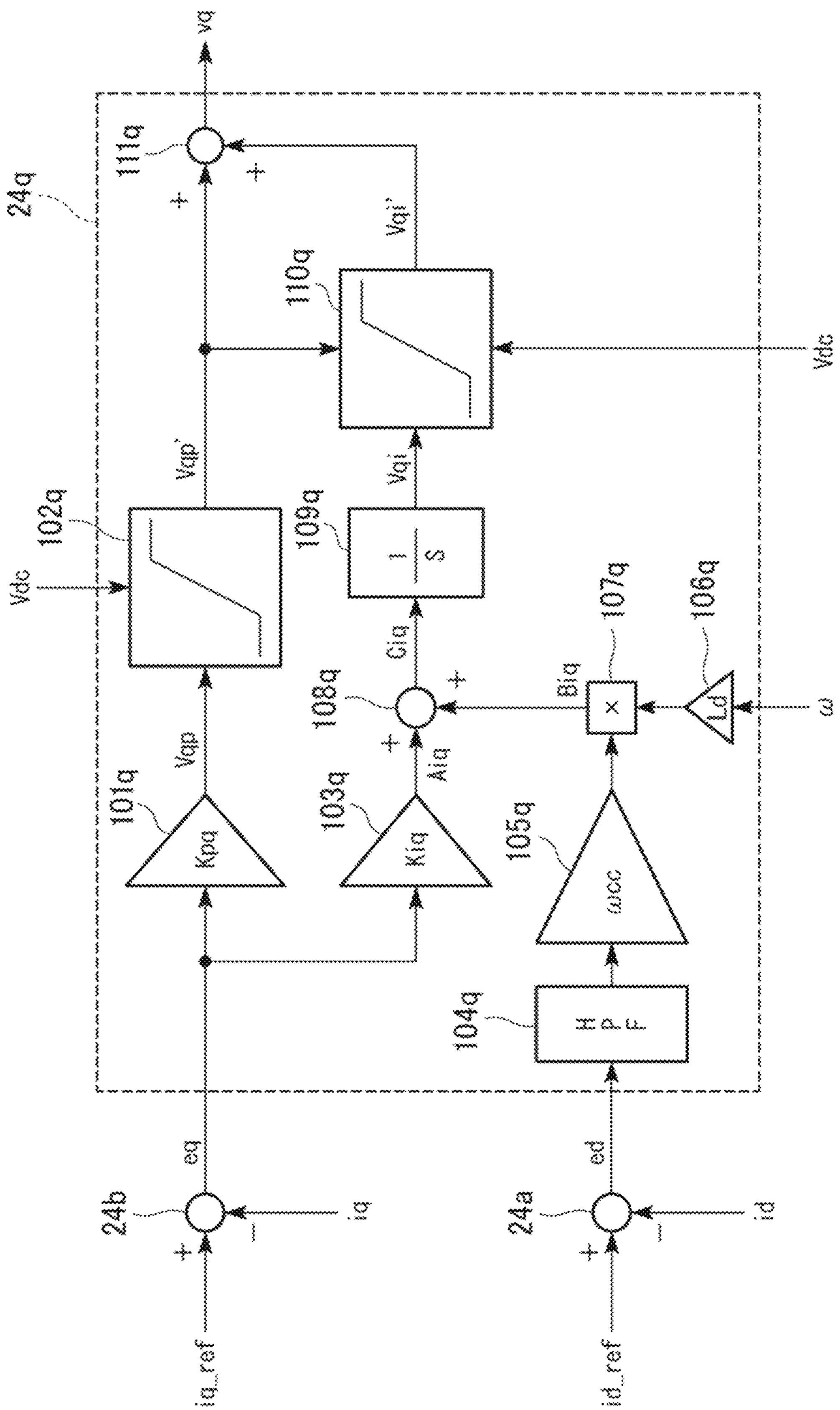
FIG. 4 is a block diagram showing a configuration of a q-axis voltage command value calculator of FIG. 1.

Details of the d-axis voltage command value calculator 24*d* are shown in FIG. 3, and details of the q-axis voltage command value calculator 24*q* are shown in FIG. 4.

Hereinafter, the d-axis voltage command value calculator 24*d* will be described with reference to FIG. 3. The d-axis voltage command value calculator 24*d* includes a d-axis proportional amplifier 101*d*, a limiter 102*d*, a d-axis integral amplifier 103*d*, a high-pass filter (HPF) 104*d*, a response angular frequency amplifier 105*d*, an inductance amplifier 106*d*, a multiplier 107*d*, a subtractor 108*d*, an integrator 109*d*, a limiter 110*d*, an adder 111*d*, and a gain changer E1.

The d-axis proportional amplifier 101*d* calculates a d-axis proportional output Vdp by multiplying the d-axis electric current deviation ed by Kpd. That is, Vdp=ed×Kpd. "Kpd" denotes a d-axis proportional gain that is multiplied in order that the rotating machine electric current actually flowing with respect to the electric current command value id_ref becomes a preferred response. For example, Kpd=ωcc×Ld. Here, ωcc denotes a response angular frequency (more specifically, a reciprocal of a time constant of a feedback control system) for adjusting the frequency response of the rotating machine electric current with respect to the electric current command value to be in a preferred range, and Ld denotes a d-axis inductance of the rotating machine 10. However, the value of Kpd is not limited to ωcc×Ld, and may be appropriately adjusted by actually measuring the responsiveness of the rotating machine electric current actually flowing with respect to the electric current command value id_ref, or the like. The d-axis proportional output Vdp calculated by the d-axis proportional amplifier 101*d* is input to the limiter 102*d*.

The limiter 102*d* compares the d-axis proportional output Vdp with an upper limit value (Vlimit) and a lower limit value (−Vlimit) and outputs a limited d-axis proportional output Vdp' based on a comparison result. However, $Vlimit=Kmax\cdot Vdc/2^{0.5}$. Kmax denotes a maximum voltage utilization rate of the inverter 12 and is set appropriately in accordance with a desired output. For example, Kmax may be 1.

Specific calculations performed by the limiter 102*d* are as follows.

$$\text{In the case of } Vdp < -Vlimit,\ Vdp' = -Vlimit \tag{A}$$

$$\text{In the case of } -Vlimit \le Vdp \le Vlimit,\ Vdp' = Vdp \tag{B}$$

$$\text{In the case of } Vlimit < Vdp,\ Vdp' = Vlimit \tag{C}$$

That is, when the d-axis proportional output Vdp exceeds the upper limit value (Vlimit) or falls below the lower limit value (−Vlimit), the limiter 102*d* limits the value of Vdp and outputs the limited value as the limited d-axis proportional output Vdp'. Moreover, when the d-axis proportional output Vdp is greater than or equal to the lower limit value and less than or equal to the upper limit value, the limiter 102*d* outputs the value of Vdp as the limited d-axis proportional output Vdp' as it is. The value of the limited d-axis proportional output Vdp' output by the limiter 102*d* is input to the limiter 110*d* and the adder 111*d*.

The d-axis integral amplifier 103*d* calculates an own-axis integral input Aid by multiplying the d-axis electric current deviation ed by Kid. That is, Aid=ed×Kid. "Kid" denotes an integral gain which is multiplied in order to set the steady value of the d-axis electric current deviation ed to 0. For example, Kid=ωcc×R. Here, R denotes a winding resistance value of the rotating machine 10. However, the value of Kid is not limited to ωcc×R, and may be appropriately adjusted based on the actual measurement result or the like. The own-axis integral input Aid calculated by the d-axis integral amplifier 103*d* is input to the subtractor 108*d*.

The high-pass filter 104*d* reduces a low-frequency component of the q-axis electric current deviation eq and outputs it to the response angular frequency amplifier 105*d*.

The response angular frequency amplifier 105*d* multiplies, by ωcc, the q-axis electric current deviation eq whose low-frequency component is reduced by the high-pass filter 104*d* and outputs a multiplication result to the multiplier 107*d*.

The inductance amplifier 106*d* multiplies the rotational angular velocity ω by Lq and outputs a multiplication result to the multiplier 107*d*. "Lq" denotes the value of the q-axis inductance of the rotating machine 10.

The multiplier 107*d* obtains an other-axis integral input Bid by multiplying the output of the response angular frequency amplifier 105*d* by the output of the inductance amplifier 106*d*. The multiplier 107*d* outputs the other-axis integral input Bid to the gain changer E1.

The gain changer E1 multiplies the other-axis integral input Bid by a gain Kd and outputs a multiplication result as a corrected other-axis integral input Bid'. That is, Bid'=Kd×Bid.

The numerical value of the gain Kd changes based on the value of the d-axis electric current deviation ed. Specifically, the gain Kd is obtained as shown in the following equations (1-1) and (1-2).

$$\text{In the case of } ed > Ith,\ Kd = 0 \tag{1-1}$$

$$\text{In the case of } ed \le Ith,\ Kd = 1 \tag{1-2}$$

Here, Ith denotes a deviation threshold value, which is a real number greater than or equal to 0. There is a correlation between an oscillation amplitude of the q-axis electric current command value iq_ref and the deviation threshold value Ith. Therefore, the specific numerical value of the deviation threshold value Ith may be set to, for example, a value of ⅕ or less of the vibration amplitude of iq_ref. Alternatively, when a change in the q-axis electric current command value iq_ref is not in an oscillating wave shape but is in a step shape, the deviation threshold value Ith may be set to 0.

In addition, if chattering in the numerical value of the d-axis electric current deviation ed occurs in the vicinity of the deviation threshold value Ith and the gain Kd alternates between 0 and 1 in a short period of time, noise may occur in the AC rotating machine 10. In this case, the change in the numerical value of the gain Kd in the vicinity of the deviation threshold value Ith may be smoothed. Alternatively, when the corrected other-axis integral input Bid' is calculated, a value of the gain Kd having passed through a low-pass filter may be used.

The subtractor 108*d* obtains a d-axis integral input Cid by subtracting the corrected other-axis integral input Bid' from the own-axis integral input Aid. The subtractor 108*d* outputs the d-axis integral input Cid to the integrator 109*d*.

The integrator 109*d* performs integral calculation on the d-axis integral input Cid and outputs an integral calculation result as a d-axis integration output Vdi to the limiter 110*d*.

The limiter 110*d* compares the d-axis integral output Vdi with the upper limit value (Vlimit−Vdp') and the lower limit value (−Vlimit−Vdp') and outputs a limited d-axis integral output Vdi' based on a comparison result. Specific calculations performed by the limiter 110*d* are as follows.

$$\text{In the case of } Vdi < -Vlimit - Vdp',\ Vdi' = -Vlimit - Vdp' \tag{D}$$

$$\text{In the case of } -Vlimit - Vdp' \le Vdi \le Vlimit - Vdp',\ Vdi' = Vdi \tag{E}$$

$$\text{In the case of } Vlimit - Vdp' < Vdi,\ Vdi' = Vlimit - Vdp' \tag{F}$$

That is, when the d-axis integral output Vdi exceeds the upper limit value (Vlimit−Vdp') or falls below the lower limit value (−Vlimit−Vdp'), the limiter 110*d* limits the value of Vdi and outputs the limited value as the limited d-axis integral output Vdi'. Moreover, when the d-axis integral output Vdi is greater than or equal to the lower limit value and less than or equal to the upper limit value, the limiter 110*d* outputs the value of Vdi as the limited d-axis integral output Vdi' as it is. The value of the limited d-axis integral output Vdi' output by the limiter 110*d* is input to the adder 111*d*.

Here, the reason why the limiter 110*d* makes limit determination using the limited d-axis proportional output Vdp' is to prevent excessive accumulation of the limited d-axis integral output Vdi' and to obtain the effect of anti-wind-up.

The adder 111*d* adds the limited d-axis proportional output Vdp' to the limited d-axis integral output Vdi' to obtain the d-axis voltage command value vd. The obtained voltage command value vd is input to the coordinate converter 25 as shown in FIG. 1.

Next, the q-axis voltage command value calculator 24*q* will be described with reference to FIG. 4. The q-axis voltage command value calculator 24*q* includes a q-axis proportional amplifier 101*q*, a limiter 102*q*, a q-axis integral amplifier 103*q*, a high-pass filter (HPF) 104*q*, a response angular frequency amplifier 105*q*, an inductance amplifier 106*q*, a multiplier 107*q*, an adder 108*q*, an integrator 109*q*, a limiter 110*q*, and an adder 111*q*.

The q-axis proportional amplifier 101*q* calculates a q-axis proportional output Vap by multiplying the q-axis electric current deviation eq by Kpq. That is, Vqp=eq×Kpq. "Kpq" denotes a q-axis proportional gain that is multiplied in order that the rotating machine electric current actually flowing with respect to the electric current command value iq_ref becomes a preferred response. For example, Kpq=ωcc×Lq. Here, as described above, ωcc denotes the response angular frequency, and Lq denotes the q-axis inductance. However, the value of Kpq is not limited to ωcc×Lq and may be appropriately adjusted by actually measuring the responsiveness of the rotating machine electric current actually flowing with respect to the electric current command value iq_ref, or the like. The q-axis proportional output Vqp calculated by the q-axis proportional amplifier 101*q* is input to the limiter 102*q*.

The limiter 102*q* compares the q-axis proportional output Vqp with the upper limit value (Vlimit) and the lower limit value (−Vlimit) and outputs a limited q-axis proportional output Vqp' based on a comparison result.

Specific calculations performed by the limiter 102*q* are as follows.

$$\text{In the case of } Vqp < -Vlimit,\ Vqp' = -Vlimit \tag{G}$$

-continued $$\text{In the case of } -Vlimit \le Vqp \le Vlimit,\ Vqp' = Vqp \tag{H}$$

$$\text{In the case of } Vlimit < Vqp,\ Vqp' = Vlimit \tag{I}$$

That is, when the q-axis proportional output Vqp exceeds the upper limit value (Vlimit) or falls below the lower limit value (−Vlimit), the limiter 102*q* limits the value of Vqp and outputs the limited value as the limited q-axis proportional output Vqp'. Moreover, when the q-axis proportional output Vqp is greater than or equal to the lower limit value and less than or equal to the upper limit value, the limiter 102*q* outputs the value of Vqp as the limited q-axis proportional output Vqp' as it is. The value of the limited q-axis proportional output Vqp' output by the limiter 102*q* is input to the limiter 110*q* and the adder 111*q*.

The q-axis integral amplifier 103*q* calculates an own-axis integral input Aiq by multiplying the q-axis electric current deviation eq by Kiq. That is, Aiq=eq×Kiq. Here, Kiq denotes an integral gain that is multiplied in order to set the steady value of the q-axis electric current deviation eq to 0. For example, Kiq=ωcc×R. However, the value of Kiq is not limited to ωcc×R and may be adjusted appropriately based on actual measurement results or the like. The own-axis integral input Aiq calculated by the q-axis integral amplifier 103*q* is input to the an adder 108*q*.

The high-pass filter 104*q* reduces a low-frequency component of the d-axis electric current deviation ed and outputs it to the response angular frequency amplifier 105*q*.

The response angular frequency amplifier 105*q* multiplies, by ωcc, the d-axis electric current deviation ed whose low-frequency component is reduced by the high-pass filter 104*q* and outputs a multiplication result to the multiplier 107*q*.

The inductance amplifier 106*q* multiplies the rotational angular velocity o by Ld and outputs a multiplication result to the multiplier 107*d*107*q*.

The multiplier 107*q* obtains an other-axis integral input Biq by multiplying an output of the response angular frequency amplifier 105*g* by an output of the inductance amplifier 106*q*. The multiplier 107*q* outputs the other-axis integral input Biq to the adder 108*q*.

The adder 108*q* calculates a q-axis integral input Ciq by adding the own-axis integral input Aiq to the other-axis integral input Biq. The adder 108*q* outputs the q-axis integral input Ciq to the integrator 109*q*.

The integrator 109*q* performs integral calculation on the q-axis integral input Ciq and outputs an integral calculation result as a q-axis integration output Vqi to the limiter 110*q*.

The limiter 110*q* compares the q-axis integral output Vqi with the upper limit value (Vlimit−Vqp') and the lower limit value (−Vlimit−Vqp') and outputs a limited q-axis integral output Vqi' based on a comparison result. Specific calculations performed by the limiter 110*q* are as follows.

$$\text{In the case of } Vqi < -Vlimit - Vqp',\ Vqi' = -Vlimit - Vqp' \tag{J}$$

$$\text{In the case of } -Vlimit - Vqp' \le Vdi \le Vlimit - Vqp',\ Vqi' = Vqi \tag{K}$$

$$\text{In the case of } Vlimit - Vqp' < Vqi,\ Vqi' = Vlimit - Vqp' \tag{L}$$

That is, when the q-axis integral output Vqi exceeds the upper limit value (Vlimit−Vqp') or falls below the lower limit value (−Vlimit−Vqp'), the limiter 110*q* limits the value of Vqi and outputs the limited value as the limited q-axis integral output Vqi'. Moreover, when the q-axis integral output Vqi is greater than or equal to the lower limit value and less than or equal to the upper limit value, the limiter 110*q* outputs the value of Vqi as the limited q-axis integral output Vqi' as it is. The value of the limited q-axis integral output Vqi' output by the limiter 110*q* is input to the adder 111*q*.

Here, the reason why the limiter 110*q* makes limit determination using the limited q-axis proportional output Vqp' is to prevent excessive accumulation of the limited q-axis integral output Vqi' and to obtain the effect of anti-wind-up.

The adder 111*q* obtains the q-axis voltage command value vq by adding the limited q-axis proportional output Vqp' to the limited q-axis integral output Vqi'. The obtained voltage command value vq is input to the coordinate converter 25.

As shown in FIG. 1, the voltage command values vd and vq on the two rotational axes (d- and q-axes) and the rotor position θ are input to the coordinate converter 25. The coordinate converter 25 performs coordinate conversion for the voltage command values vd and vq based on the rotor position θ and calculates the voltage command values vu, vv, and vw on the three-phase coordinates.

Figure 5:
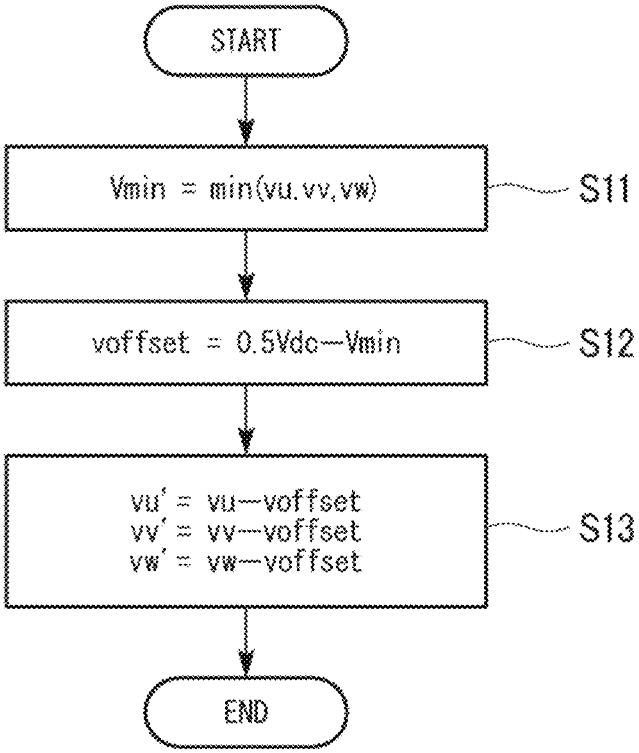
FIG. 5 is a flowchart showing an example of a process performed by a corrected voltage generator of FIG. 1.

The corrected voltage generator 26 generates the corrected voltage command values vu', vv', and vw' based on the voltage command values vu, vv, and vw output from the coordinate converter 25 and an offset voltage voffset. FIG. 5 is a flowchart showing a process performed by the corrected voltage generator 26 in Embodiment 1.

When the process of the flowchart shown in FIG. 5 is started, step S11 is first executed. In step S11, the corrected voltage generator 26 selects a smallest value from the voltage command values vu, vv, and vw and sets the selected value as Vmin.

Subsequently, in step S12, the corrected voltage generator 26 sets the value of the offset voltage voffset to 0.5 Vdc−Vmin.

Subsequently, in step S13, the corrected voltage generator 26 obtains the corrected voltage command values vu', vv', and vw' by subtracting the offset voltage voffset from the voltage command values vu, vv, and vw, respectively.

Figure 6:
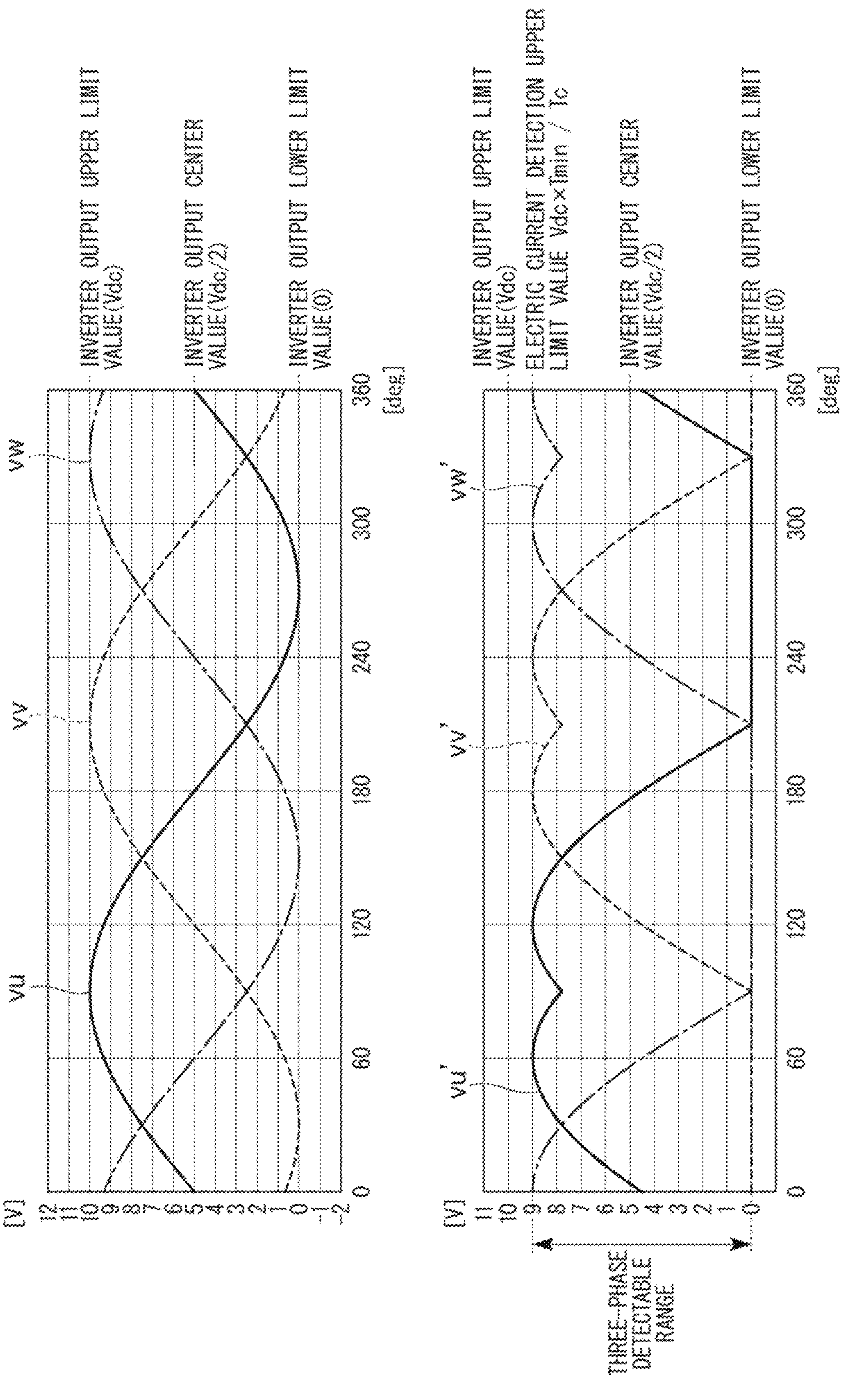
FIG. 6 is a diagram showing an example of waveforms of a voltage command value and a corrected voltage command value in Embodiment 1.

FIG. 6 is a diagram showing an example of waveforms of the voltage command values vu, vv, and vw and the corrected voltage command values vu', vv', and vw' in Embodiment 1. Furthermore, in FIG. 6, the waveform graph of the voltage command values vu, vv, and vw is shown on the upper side, and the waveform graph of the corrected voltage command values vu', vv', and vw' is shown on the lower side. In each graph shown in FIG. 6, the DC bus voltage Vdc=10 V. Here, the range of a voltage capable of being output by the inverter 12 is 0 (a minimum value of the carrier triangle wave C) to Vdc (a maximum value of the carrier triangle wave C). For this reason, when the DC bus voltage Vdc=10 V, the range of a voltage capable of being output by the inverter 12 is 0 V to 10 V as shown in FIG. 6.

When a process of steps S11 to S13 shown in FIG. 5 is performed, the minimum values of the corrected voltage command values vu', vv', and vw' always matches the lower limit value of the output of the inverter as shown in the lower graph of FIG. 6. This means that the corrected voltage command values vu', vv', and vw' are offset to the lower side as equally as possible in three phases within a range in which the voltage is not saturated and the ON-time of the lower arm-switching elements Sun, Svn, and Swn increases as much as possible. This point is advantageous from the viewpoint of electric current detection in an inverter including the shunt resistors Ru, Rv, and Rw in series with respect to the lower arm-switching elements Sun, Svn, and Swn, as in the present embodiment.

Furthermore, a method of calculating the offset voltage voffset is not limited to the above-described method. For example, in step S11 of FIG. 5, in addition to a process of selecting a smallest value from the voltage command values vu, vv, and vw and setting the selected value to Vmin, a process in which a largest value is selected from the voltage command values vu, vv, and vw and is set to Vmax may be performed. Also, in step S12, a process of setting voffset to "(Vmax+Vmin)/2" may be performed. Thus, a method of making voffset=(Vmax+Vmin)/2 is referred to as third-harmonic addition or HIP modulation. Moreover, the upper arm-switching element corresponding to the phase having the highest voltage command value among the three phases may always be in an ON state, and so-called two-phase modulation may be adopted.

The corrected voltage command values vu', vv', and vw' generated by the corrected voltage generator 26 according to the above calculation are input to the PWM signal generator 27. Then, the PWM signal generator 27 performs PWM modulation for the corrected voltage command values vu', vv', and vw' and outputs PWM modulation results as the switching signals Gup to Gwn to the inverter 12.

Figure 7:
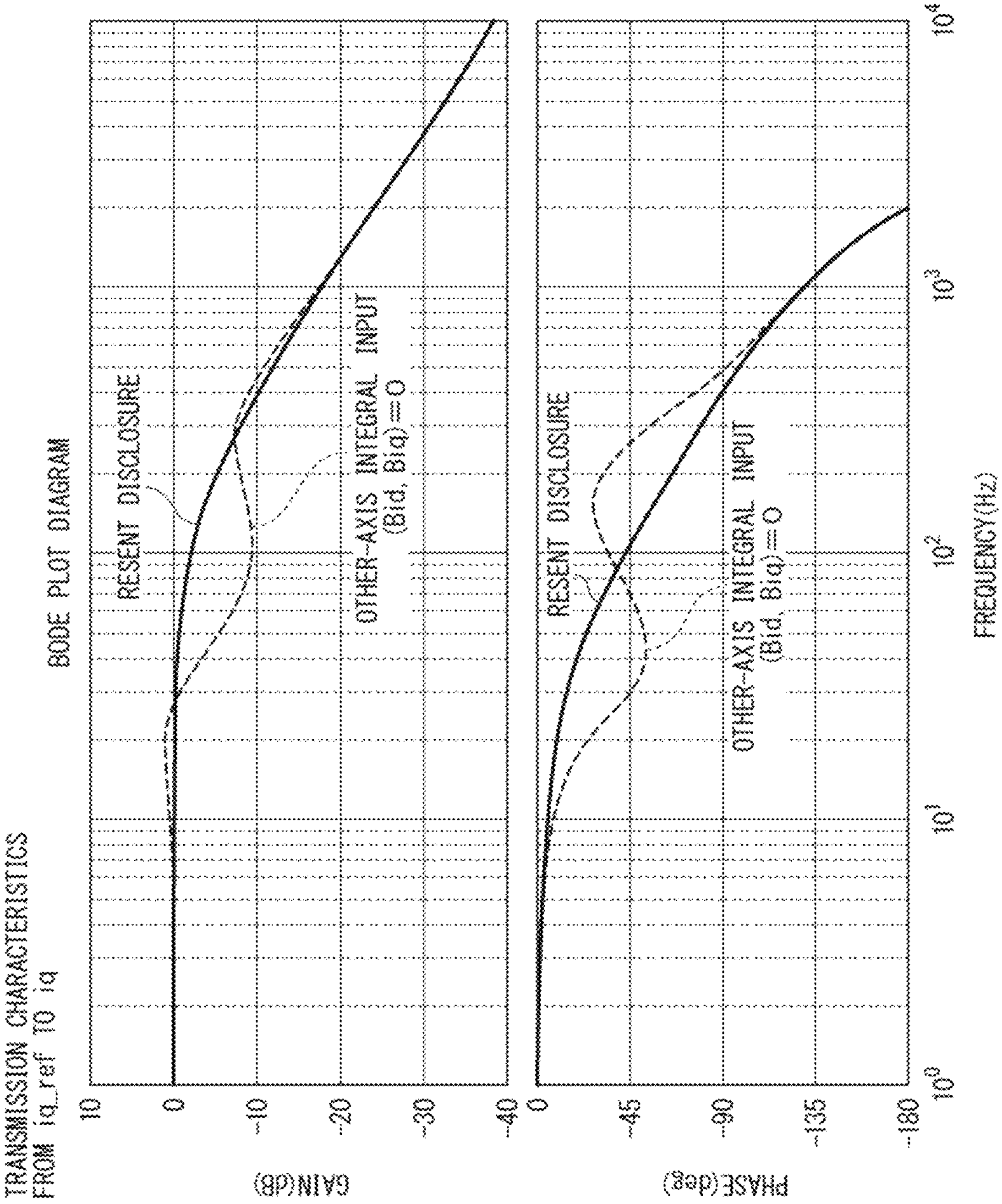
FIG. 7 is a Bode plot diagram showing transmission characteristics from a q-axis electric current command value to a detected q-axis electric current value when a rotational angular velocity is high in the control device according to Embodiment 1.

FIG. 7 is a Bode plot diagram showing transmission characteristics from the q-axis electric current command value iq_ref to the detected q-axis electric current value iq when the rotational angular velocity ω is high in the control device 1 according to Embodiment 1. In FIG. 7, a gain diagram is shown on the upper side and a phase diagram is shown on the lower side. In both the gain diagram and the phase diagram, the "present disclosure" indicates the transmission characteristics according to Embodiment 1, and the "other-axis integral input (Bid, Biq)=0" indicates characteristics of a case where 0 (zero) is forcibly input as values of Bid and Biq (see FIGS. 3 and 4).

As shown in the gain diagram of FIG. 7, there is a drop in the gain in the vicinity of 100 Hz in "other-axis integral input (Bid, Biq)=0." In contrast, in the "present disclosure," there is no drop in the vicinity of 100 Hz, and the transmission characteristics of an ideal first order delay system are obtained. That is, the control device 1 according to the present disclosure can obtain a suitable control result even if the rotational angular velocity ω is high.

Next, the effect brought by the d-axis voltage command value calculator 24*d* including the gain changer E1 will be described. When the rotating machine 10 is a permanent magnet synchronous rotating machine, a relationship between a voltage and an electric current is expressed by the following equations (1-3) and (1-4) that are voltage equations.

$$vd=(R+sLd)\times id+\omega\times Lq\times iq \tag{1-3}$$

$$vq=(R+sLq)\times iq+\omega\times Ld\times id+\omega\times\phi \tag{1-4}$$

In the equations (1-3) and (1-4), s denotes an operator of a Laplace transform, and ϕ denotes the number of interlinked magnetic fluxes.

When the rotational angular velocity ω of the rotating machine 10 rapidly increases, the value of the third term (ω×ϕ) on the right side of the equation (1-4) rapidly increases. On the other hand, if a change in the q-axis voltage command value vq is slower than a change in the rotational angular velocity ω and is regarded as sufficiently small with respect to the amount of change in "ω×ϕ," the first term ((R+sLq)×iq) on the right side rapidly decreases. That is, the electric current value iq of the q-axis rapidly decreases. Also, due to the decrease in the electric current value iq of the q-axis, the q-axis electric current deviation eq in FIG. 3 rapidly increases. Thereby, the other-axis integral input Bid rapidly increases.

If no gain changer E1 is provided, the d-axis integral input Cid calculated based on the rapidly increased other-axis integral input Bid is input to the integrator 109*d* as it is, and the d-axis integration output Vdi rapidly decreases (the value thereof rapidly increases in the negative direction). As a result, in the equation (1-3), the left side (the voltage command value vd of the d-axis) and the first term on the right side rapidly decrease (rapidly increase in the negative direction). A rapid decrease in the first term on the right side of the equation (1-3) means that the electric current value id of the d-axis rapidly decreases (rapidly increases in the negative direction). When the electric current value id rapidly increases in the negative direction with respect to the electric current command value id_ref, it means that the rotating machine electric current in the d-axis is excessive. Also, if the electric current becomes excessive in this way, damage to the AC rotating machine 10, demagnetization of the permanent magnet, damage to the switching element of the inverter 12, or the like may be caused.

Therefore, in the present embodiment, the gain changer E1 is provided as shown in FIG. 3. When the d-axis electric current deviation ed exceeds the deviation threshold value Ith, according to an operation of the gain changer E1, the corrected other-axis integral input Bid' becomes 0, and the d-axis integral output Vdi is maintained and does not rapidly decrease. In other words, even if the q-axis electric current deviation eq increases, the excess of the electric current value id in the d-axis for the electric current command value id_ref is suppressed within the deviation threshold value Ith. Therefore, it is possible to provide the control device 1 of the AC rotating machine 10 having high stability in which damage to the AC rotating machine 10, demagnetization of the permanent magnet, damage of the switching element of the inverter 12, and the like are suppressed.

As described above, the control device 1 according to Embodiment 1 includes the inverter 12 configured to apply a voltage to the AC rotating machine 10, the electric current detector 22 configured to detect a rotating machine electric current flowing through the rotating machine 10, the d-axis voltage command value calculator 24*d* (first axis voltage command value calculator) configured to calculate a voltage command value vd of the d-axis (first axis) between two rotational axes of the rotating machine 10, and the q-axis voltage command value calculator 24*q* (second axis voltage command value calculator) configured to calculate a voltage command value vq of the q-axis (second axis) between the two rotational axes. The d-axis voltage command value calculator 24*d* includes the gain changer E1 configured to change the set value of the gain Kd based on the d-axis electric current deviation ed (first deviation) that is a deviation between the electric current command value id_ref of the d-axis and the detected electric current value id of the d-axis. Also, the d-axis voltage command value calculator 24*d* performs integral calculation using an integral input (the corrected other-axis integral input Bid') calculated based on the gain Kd and the q-axis electric current deviation eq (second deviation) that is a deviation between the electric current command value iq_ref of the q-axis and the detected electric current value iq of the q-axis and calculates the voltage command value vd of the d-axis based on the result of the integral calculation.

According to such a configuration, when the voltage command value vd of the d-axis is calculated, the proportion of the q-axis electric current deviation eq input to the integration calculation changes according to the d-axis electric current deviation ed. Thereby, for example, even when the q-axis electric current deviation eq rapidly has increased or decreased due to a rapid decrease or a rapid increase in the induced voltage, an excess in the rotating machine electric current in the d-axis can be suppressed.

Moreover, since the AC rotating machine 10 according to the present embodiment is a permanent magnet synchronous rotating machine, an induced voltage is generated in the q-axis. In consideration of this, the gain changer E1 reduces the set value of the gain Kd when the d-axis electric current deviation ed exceeds the deviation threshold value Ith. According to this configuration, for example, when the induced voltage rapidly increases due to the rapid acceleration of the rotating machine 10, an excess in the rotating machine electric current in the d-axis in the negative direction by the q-axis electric current deviation eq rapidly increasing can be suppressed.

Furthermore, the gain changer E1 may set the set value of the gain Kd to zero when the d-axis electric current deviation ed exceeds the deviation threshold value Ith. In this case, since the input value based on the q-axis electric current deviation eq to the integrator 109*d* is set to zero, the weak field current (d-axis rotating machine electric current) can be more effectively prevented from becoming excessive.

Moreover, the d-axis voltage command value calculation unit 24*d* executes the integral calculation using a value obtained by multiplying the q-axis electric current deviation eq by the rotational angular velocity ω of the AC rotating machine, the q-axis inductance Lq, and the response angular frequency ωcc for adjusting the frequency response of the rotating machine electric current with respect to the electric current command value. Thereby, a desired frequency response can be obtained without depending on the rotational angular velocity ω of the rotating machine. Likewise, the q-axis voltage command value calculation unit 24*q* executes the integral calculation using a value obtained by multiplying the d-axis electric current deviation ed by the rotational angular velocity ω of the AC rotating machine, the d-axis inductance Ld, and the response angular frequency ωcc for adjusting the frequency response of the rotating machine electric current with respect to the electric current command value.

Embodiment 2

Next, Embodiment 2 in the present disclosure will be described, but the basic configuration is similar to that of Embodiment 1. For this reason, description of parts equivalent to those of Embodiment 1 will be omitted and differences therebetween will be mainly described.

Figure 8:
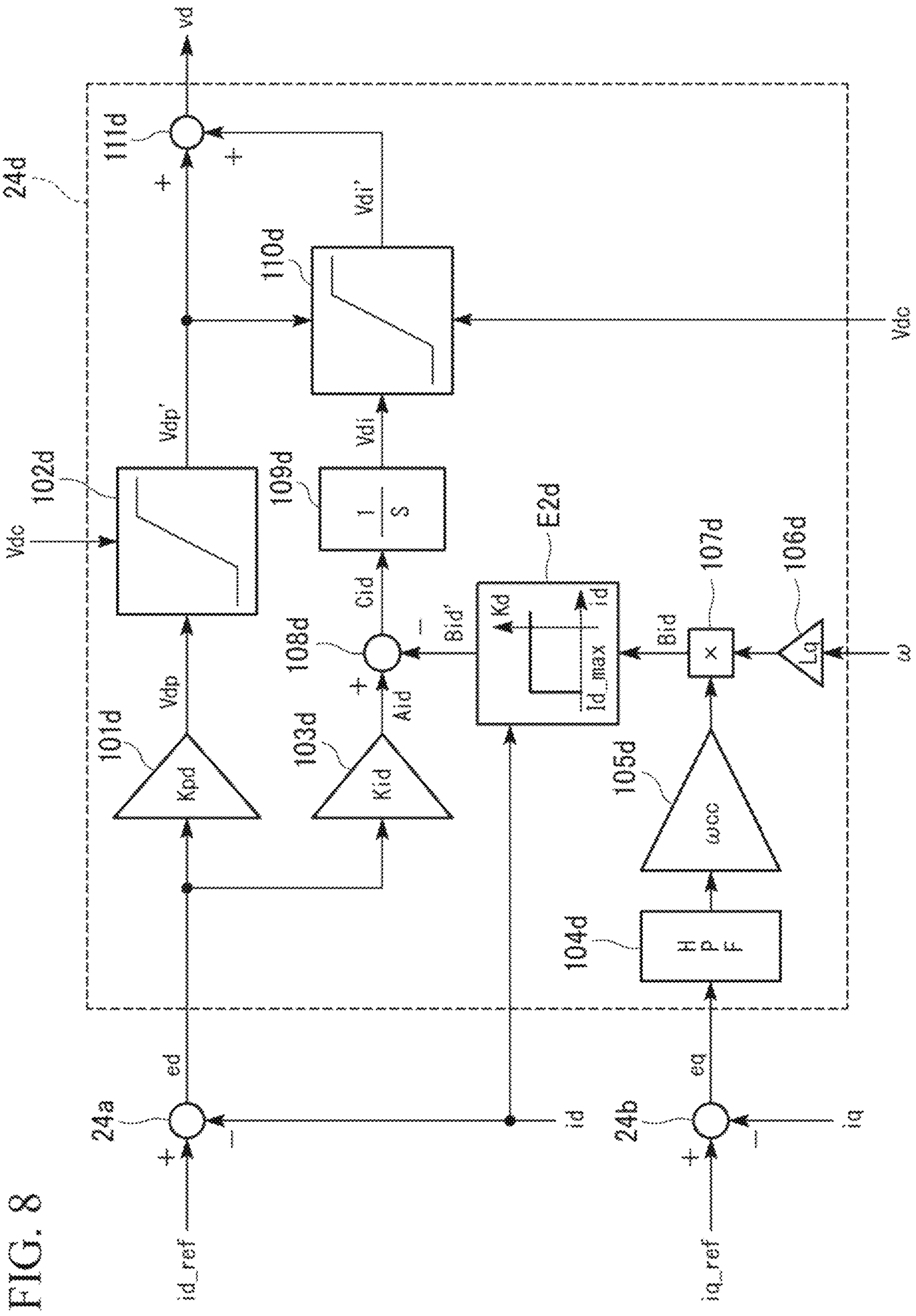
FIG. 8 is a block diagram showing a configuration of a d-axis voltage command value calculator according to Embodiment 2.
Figure 9:
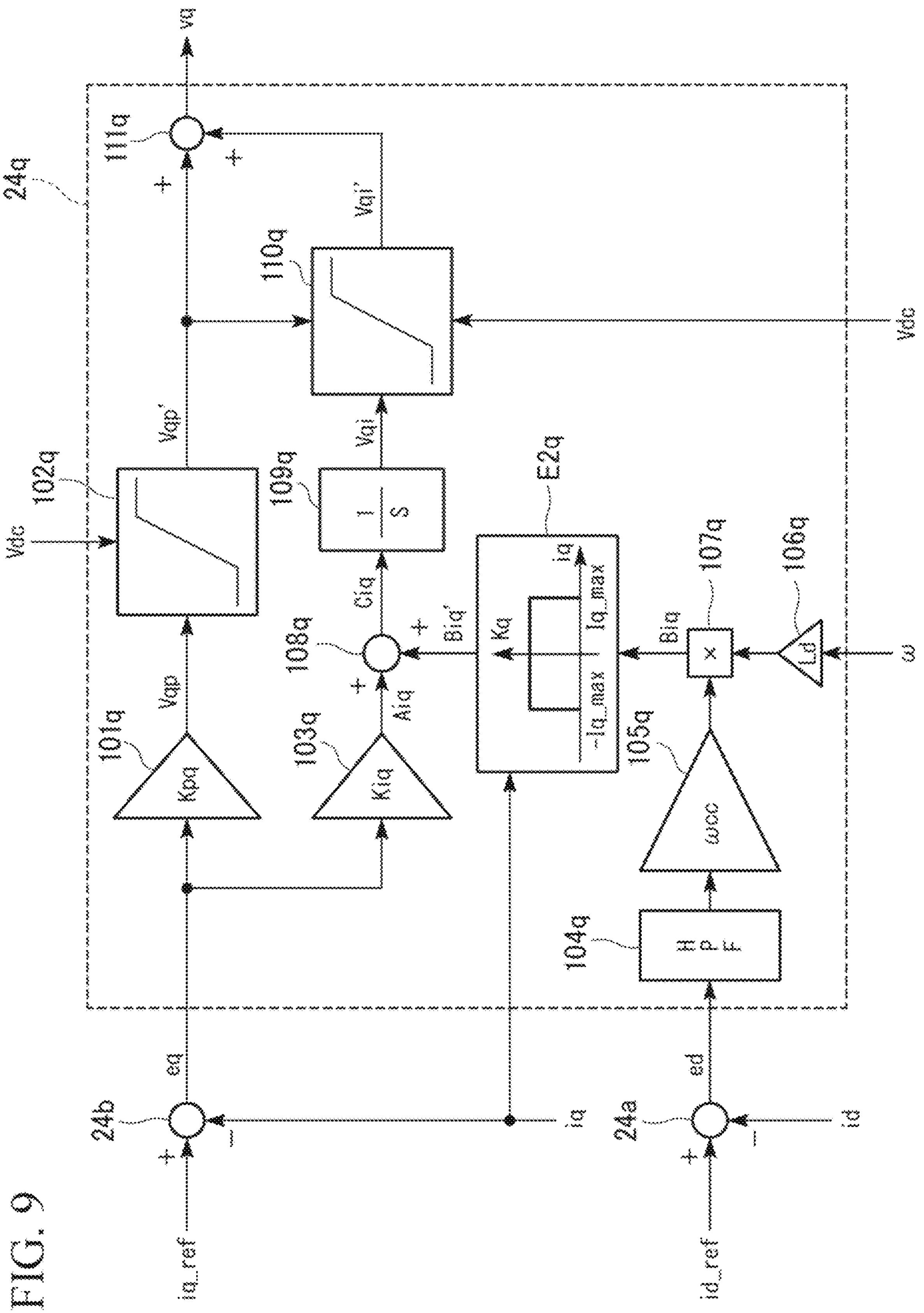
FIG. 9 is a block diagram showing a configuration of a q-axis voltage command value calculator according to Embodiment 2.

FIGS. 8 and 9 are block diagrams showing configurations of a d-axis voltage command value calculator 24*d* and a q-axis voltage command value calculator 24*q* according to Embodiment 2.

The d-axis voltage command value calculator 24*d* shown in FIG. 8 is different from that of Embodiment 1 (FIG. 3) in that the d-axis voltage command value calculator 24*d* includes a gain changer E2*d* instead of the gain changer E1. A detected electric current value id of a d-axis and an other-axis integral input Bid are input to the gain changer E2*d*. The gain changer E2*d* multiplies the other-axis integral input Bid by a gain Kd and outputs a multiplication result as a corrected other-axis integral input Bid'.

In Embodiment 2, the numerical value of the gain Kd changes based on the detected electric current value id of the d-axis. Specifically, the gain Kd is obtained as shown in the following equations (2-1) and (2-2).

$$\text{In the case of } id > \text{Id\_max}, Kd = 1 \tag{2-1}$$

$$\text{In the case of } id \leq \text{Id\_max}, Kd = 0 \tag{2-2}$$

Here, an electric current threshold value Id_max is a maximum value of a weak field current and is a real number less than or equal to 0. The specific numerical value of the electric current threshold value Id_max may be set to, for example, a maximum value of a negative electric current that can flow through the AC rotating machine 10 in a range in which demagnetization of the permanent magnet does not occur. Alternatively, with respect to this maximum value, a numerical value shifted to the positive side may be designated as a set value of the electric current threshold value Id_max.

Alternatively, the set value of the electric current threshold value Id_max may be changed according to an electric current command value id_ref of the d-axis. In this case, Id_max=id_ref+Id_margin may be defined using an electric current margin value Id_margin having a negative numerical value. According to this setting, when an amount by which the detected electric current value id of the d-axis is greater than the electric current command value id_ref exceeds the electric current margin value Id_margin, the gain Kd is set to 0, and the rotating machine electric current of the d-axis can be prevented from becoming excessive. However, if chattering in the detected electric current value id of the d-axis occurs in the vicinity of the electric current threshold value Id_max and the gain Kd alternates between 0 and 1 in a short period of time, noise may occur in the AC rotating machine 10. In this case, the change in the numerical value of the gain Kd in the electric current threshold value Id_max may be smoothed. Alternatively, when the corrected other-axis integral input Bid' is calculated, the value of the gain Kd having passed through the low-pass filter may be used.

The q-axis voltage command value calculator 24*q* shown in FIG. 9 is different from that of Embodiment 1 (FIG. 4) in that the q-axis voltage command value calculator 24*q* further includes a gain changer E2*q*. The detected electric current value iq of the q-axis and the other-axis integral input Biq are input to the gain changer E2*q*. The gain changer E2*q* multiplies the other-axis integral input Biq by a gain Kq and outputs a multiplication result as the corrected other-axis integral input Biq'. That is, Biq'=Kq×Biq.

An adder 108*q* in the present embodiment obtains a q-axis integral input Ciq by adding an own-axis integral input Aiq to the corrected other-axis integral input Biq'. The adder 108*q* outputs the q-axis integral input Ciq to the integrator 109*q*. The subsequent process is similar to that of Embodiment 1, so description thereof will be omitted.

The numerical value of the gain Kq changes based on the detected electric current value iq of the q-axis. Specifically, the gain Kq is obtained as shown in the following equations (2-3), (2-4), and (2-5).

$$\text{In the case of } iq > \text{Iq\_max}, Kq = 0 \tag{2-3}$$

-continued $$\text{In the case of } -\text{Iq\_max} \leq iq \leq \text{Iq\_max}, Kq = 1 \tag{2-4}$$

$$\text{In the case of } -\text{Iq\_max} > iq, Kq = 0 \tag{2-5}$$

Here, the electric current threshold value Iq_max is a maximum value of the q-axis electric current, which is a real number greater than 0. The specific numerical value of the electric current threshold value Iq_max may be, for example, a rated electric current of the AC rotating machine 10, a rated electric current of the inverter 12, a rated electric current of the switching element provided in the inverter 12, or the like. Alternatively, a numerical value shifted from these rated electric currents to the negative side may be used as a set value of the electric current threshold value Iq_max.

Alternatively, the set value of the electric current threshold value Iq_max may be changed according to the electric current command value iq_ref of the q-axis. In this case, Iq_max=iq_ref+Iq_margin may be defined using an electric current margin value Iq_margin having a positive numerical value. According to this setting, when an amount by which the detected electric current value iq of the q-axis is greater than the electric current command value iq_ref exceeds the electric current margin value Iq_margin, the gain Kq is set to 0, and the rotating machine electric current of the q-axis can be prevented from becoming excessive. However, if chattering in the detected electric current value iq of the q-axis occurs in the vicinity of the electric current threshold value Iq_max and the gain Kq alternates between 0 and 1 in a short period of time, noise may occur in the AC rotating machine 10. In this case, the change in the numerical value of the gain Kq in the electric current threshold value Iq_max may be smoothed. Alternatively, when the corrected other-axis integral input Biq' is calculated, a value of the gain Kq having passed through the low-pass filter may be used.

As described above, the d-axis voltage command value calculator 24*d* according to Embodiment 2 includes the gain changer E2*d* configured to change the set value of the gain Kd based on the detected electric current value id of the d-axis. Also, the d-axis voltage command value calculator 24*d* performs integral calculation using an integral input (the corrected other-axis integral input Bid') calculated based on the gain Kd and the q-axis electric current deviation eq (second deviation) that is a deviation between the electric current command value iq_ref of the q-axis and the detected electric current value iq of the q-axis and calculates the d-axis voltage command value vd based on the result of the integral calculation.

According to this configuration, when the voltage command value vd of the d-axis is calculated, a proportion of the q-axis electric current deviation ed input to the integral calculation changes according to the detected electric current value id of the d-axis. Thereby, even if the q-axis electric current deviation rapidly increases or decreases, for example, due to a rapid decrease or increase in the induced voltage, an excess in the rotating machine electric current of the d-axis can be suppressed.

Also, since the AC rotating machine 10 according to the present embodiment is a permanent magnet synchronous rotating machine, an induced voltage is generated in the q-axis. In consideration of this, the gain changer E2*d* lowers the set value of the gain Kd when the detected electric current value id of the d-axis exceeds the electric current threshold value Id_max to the negative side. According to this configuration, when the induced voltage rapidly increases due to, for example, the rapid acceleration of the rotating machine 10, an excess in the rotating machine electric current of the d-axis in the negative direction due to the rapid increase in the q-axis electric current deviation eq can be suppressed.

Furthermore, the gain changer E2*d* may set the gain Kd to zero when the detected electric current value id of the d-axis exceeds the electric current threshold value Id_max to the negative side. In this case, since an input value based on the q-axis electric current deviation eq to the integrator 109*d* is set to zero, the weak field current (d-axis rotating machine electric current) can be more effectively prevented from becoming excessive.

Moreover, in Embodiment 2, the q-axis voltage command value calculator 24*q* also includes the gain changer E2*q*. That is, when the detected electric current values id and iq of the AC rotating machine 10 exceed the electric current threshold values Iq_max and Id_max, it is possible to prevent excessive rotating machine electric currents of both the d-axis and the q-axis by decreasing the gains Kd and Kq by which the term (Bid, Biq) based on the other-axis deviation (the electric current deviation eq seen from the d-axis voltage command value calculator 24*d* and the electric current deviation ed seen from the q-axis voltage command value calculator 24*q*) is multiplied.

Moreover, the electric current threshold values Id_max and Iq_max are determined based on the electric current command values id_ref and iq_ref and the electric current margin values Id_margin and Iq_margin, and therefore it is possible to prevent the rotating machine electric current exceeding this margin from flowing. Therefore, it is possible to improve the control performance of the AC rotating machine.

Embodiment 3

Next, Embodiment 3 in the present disclosure will be described, but a basic configuration thereof is similar to that of Embodiment 1. For this reason, description of parts equivalent to those of Embodiment 1 will be omitted, and differences will be mainly described.

Figure 10:
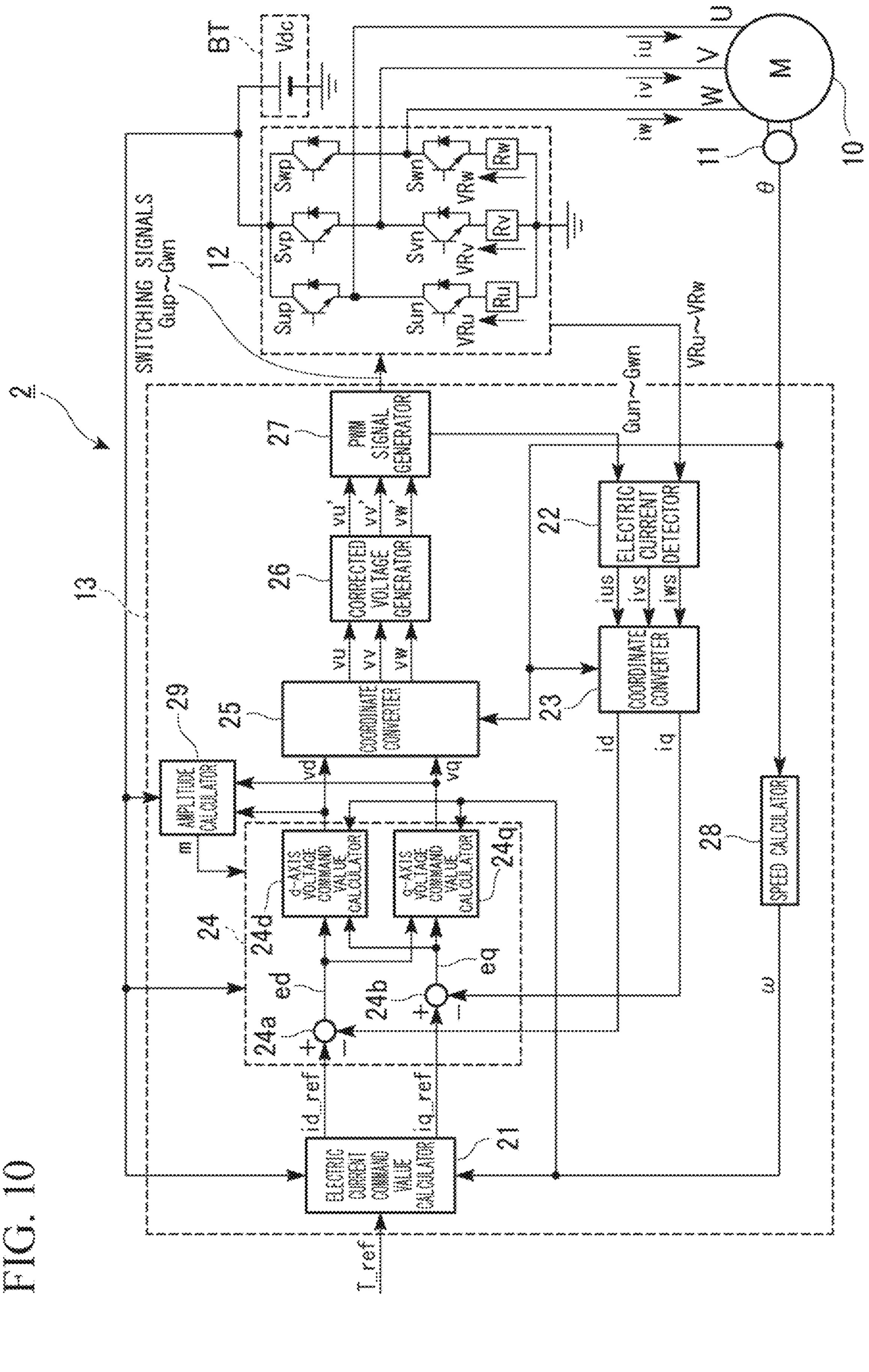
FIG. 10 is a block diagram showing a schematic configuration of a control device for a rotating machine according to Embodiment 3.
Figure 11:
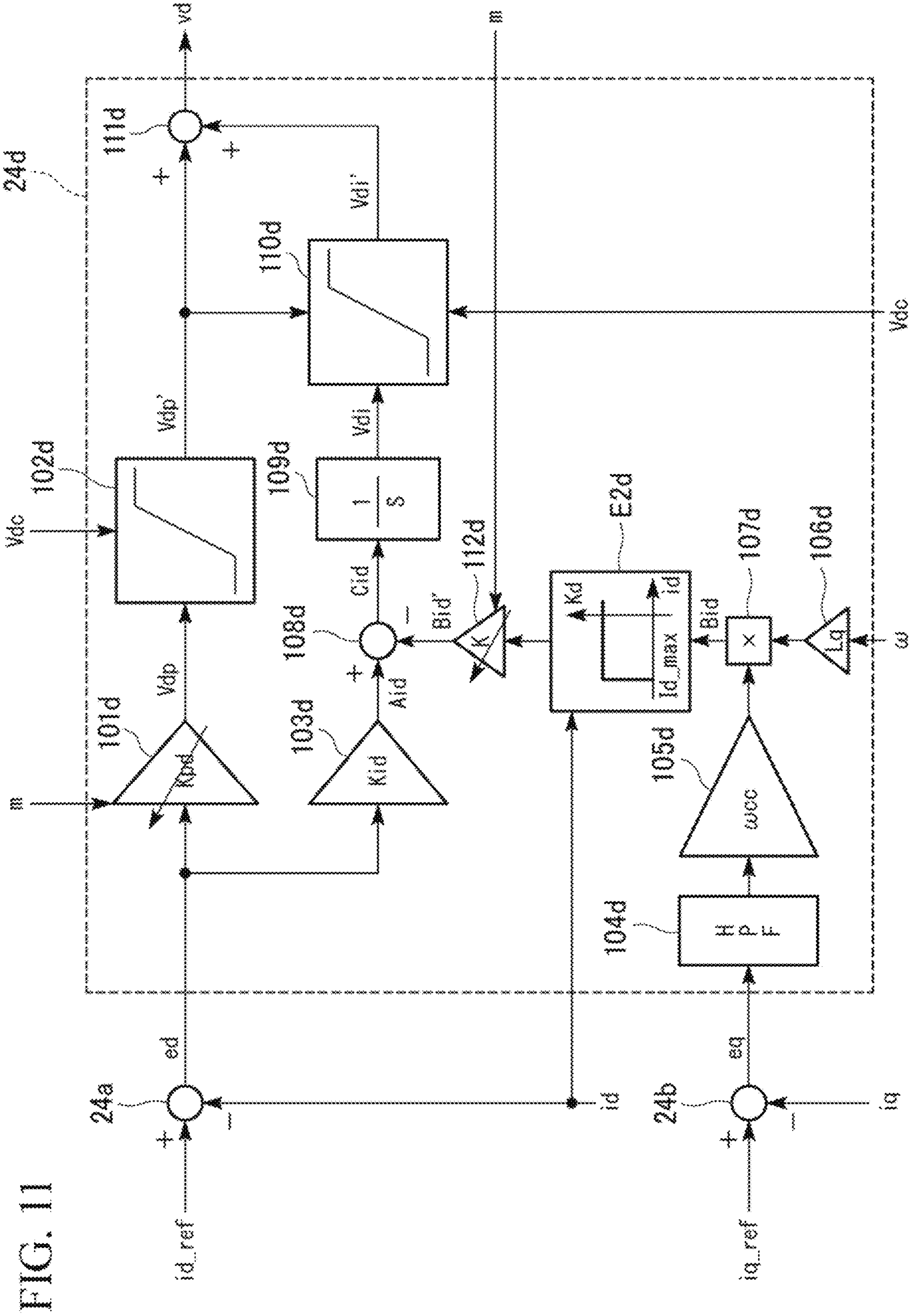
FIG. 11 is a block diagram showing a configuration of a d-axis voltage command value calculator according to Embodiment 3.
Figure 12:
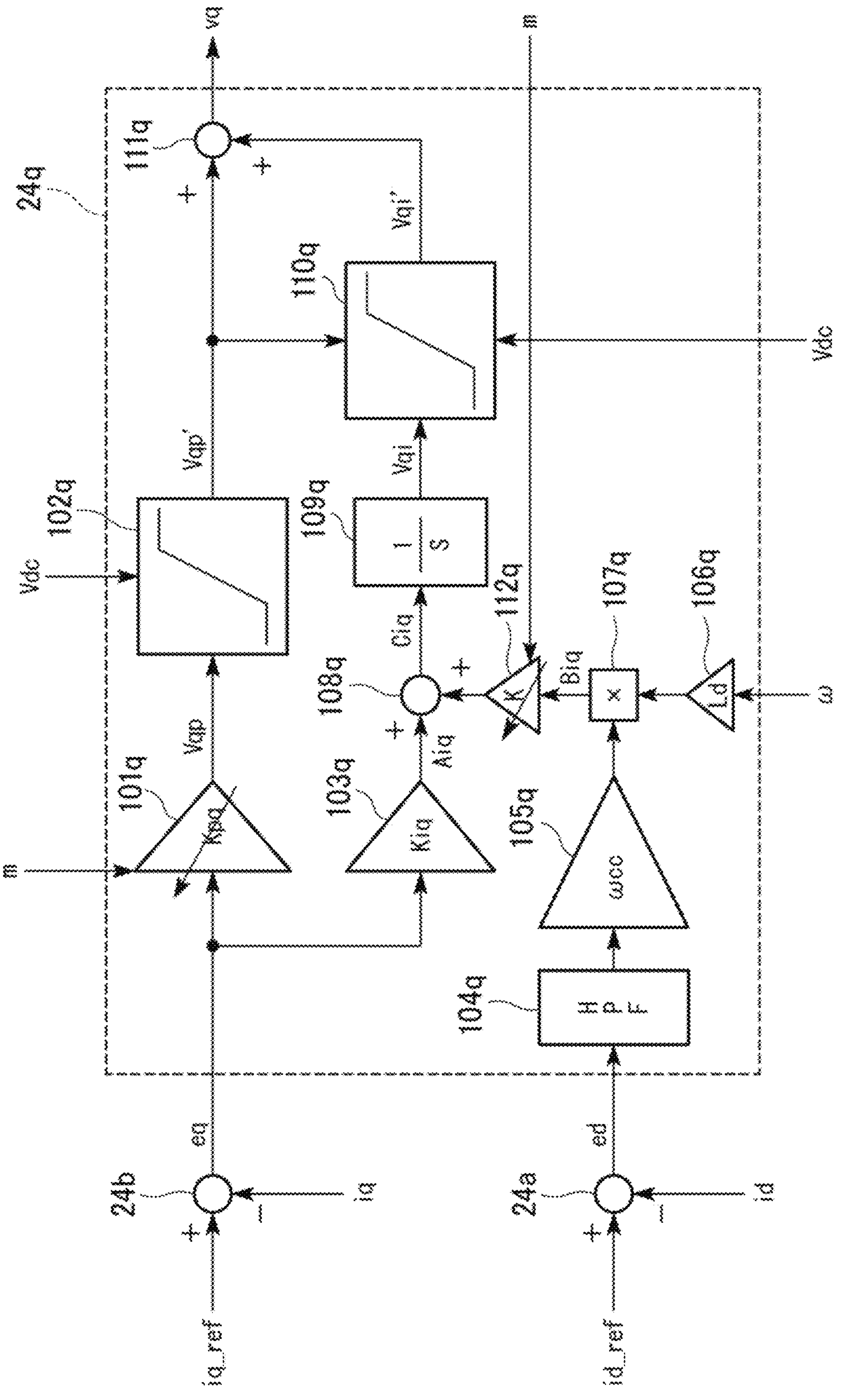
FIG. 12 is a block diagram showing a configuration of a q-axis voltage command value calculator according to Embodiment 3.

FIG. 10 is a block diagram showing a schematic configuration of a control device 2 of a rotating machine according to Embodiment 3. As shown in FIG. 10, the control device 2 is different from the control device 1 according to Embodiment 1 in that the control device 2 includes an amplitude calculator 29. Moreover, FIGS. 11 and 12 are block diagrams showing configurations of a d-axis voltage command value calculator 24*d* and a q-axis voltage command value calculator 24*q* according to Embodiment 3, respectively. The configurations of the d-axis voltage command value calculator 24*d* and the q-axis voltage command value calculator 24*q* are also different between Embodiment 1 and Embodiment 3.

As shown in FIG. 10, a d-axis voltage command value vd, a q-axis voltage command value vq, and a DC bus voltage Vdc are input to the amplitude calculator 29. The amplitude calculator 29 calculates a voltage amplitude m based on the following equation (3-1). The voltage amplitude m is a numerical value obtained by standardizing magnitudes of the d-axis voltage command value vd and the q-axis voltage command value vq using the DC bus voltage Vdc of the inverter 12.

$$m = \{(vd^2 + vq^2)/(Vdc/2)\}^{0.5} \tag{3-1}$$

As shown in FIG. 11, the d-axis voltage command value calculator 24*d* according to Embodiment 3 includes an amplifier 112*d*, and a gain changer E2*d* similar to that of Embodiment 2 (see FIG. 8). The amplifier 112*d* inputs a result of multiplying, by K, an output from the gain changer E2*d* to the subtractor 108*d*. "K" denotes a limit gain that is multiplied when an electric current deviation eq of the q-axis that is not a control target as seen from the d-axis voltage command value calculator 24*d* is an integral input. The voltage amplitude m is input to the amplifier 112*d*, and the value of the limit gain K is determined based on the value of the voltage amplitude m. In the d-axis voltage command value calculator 24*d* according to the present embodiment, the voltage amplitude m is also input to the d-axis proportional amplifier 101*d*.

The present embodiment is different from Embodiment 1 in that a proportional gain Kpd of the d-axis and the limit gain K are changed in accordance with the voltage amplitude m.

As shown in FIG. 12, the q-axis voltage command value calculator 24*q* of Embodiment 3 includes an amplifier 112*q*. The amplifier 112*q* inputs a result of multiplying, by K, an output from the multiplier 107*q* to the integrator 122*q*. "K" denotes a limit gain that is multiplied when the electric current deviation ed of the d-axis that is not the control target as seen from the q-axis voltage command value calculator 24*q* is an integral input. The voltage amplitude m is input to the amplifier 112*q*, and the value of the limit gain K is determined based on the value of the voltage amplitude m. In the q-axis voltage command value calculator 24*q* according to the present embodiment, the voltage amplitude m is also input to the q-axis proportional amplifier 101*q*.

The present embodiment is different from Embodiment 1 in that a proportional gain Kpq of the q-axis and the limit gain K are changed in accordance with the voltage amplitude m.

Figure 13:
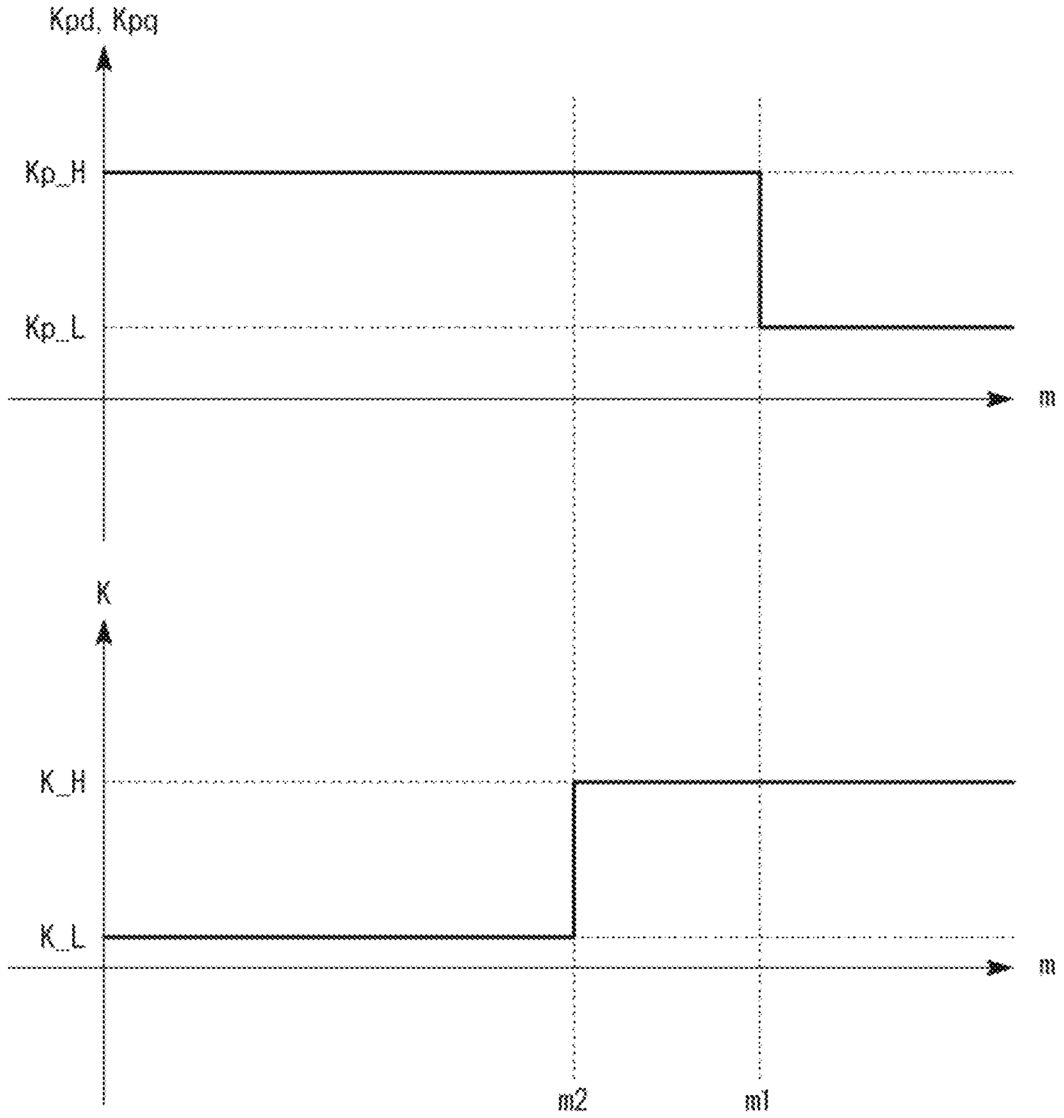
FIG. 13 is a diagram showing a relationship between a proportional gain, a limit gain, and a voltage amplitude in Embodiment 3.

FIG. 13 shows relationships between the voltage amplitude m and the proportional gains Kpd and Kpq and the limit gain K. The vertical axis of the upper graph in FIG. 13 represents the proportional gains Kpd and Kpq, and the vertical axis of the lower graph therein represents the limit gain K. In both the upper and lower sides, the horizontal axis represents the voltage amplitude m. In FIG. 13, m1 denotes a first voltage threshold value, and m2 denotes a second voltage threshold value.

The proportional gains Kpd and Kpq are switched between a first proportional value Kp_H and a second proportional value Kp_L. The second proportional value Kp_L is less than the first proportional value Kp_H.

The limit gain K is switched between a first limit value K_H and a second limit value K_L. The second limit value K_L is less than the first limit value K_H.

As shown in FIG. 13, when the voltage amplitude m is higher than the first voltage threshold value m1, the values of the proportional gains Kpd and Kpq are set to the second proportional value Kp_L. Moreover, when the voltage amplitude m is lower than the first voltage threshold value m1, the proportional gains Kpd and Kpq are set to the first proportional value Kp_H.

When the voltage amplitude m is higher than the second voltage threshold value m2, the limit gain K is set to the first limit value K_H. Moreover, when the voltage amplitude m is lower than the second voltage threshold value m2, the limit gain K is set to the second limit value K_L. Here, the first voltage threshold value m1 is higher than the second voltage threshold value m2. Therefore, when the values of the proportional gains Kpd and Kpq are Kp_L, the value of the limit gain K is K_H.

Thus, only when the limit gain K is a high value K_H (i.e., a state in which non-interference control between the d- and q-axes is sufficiently effective), a process of decreasing the proportional gains Kpd and Kpq is performed, and therefore control stability can be ensured even if the proportional gains Kpd and Kpq are low. Moreover, when the limit gain K is a low value K_L, the proportional gains Kpd and Kpq are set to a high value Kp_H in order that the control stability can be ensured even in a state in which non-interference control between the d- and q-axes is not sufficient. Specifically, the values of Kp_H and Kp_L are set such that responses from the electric current command values id_ref and iq_ref to the rotating machine electric currents iu, iv, and iw are preferably within the range of 300 Hz to 1000 Hz and the range of 100 Hz to 300 Hz, respectively. For example, the value of K_H is set to 0.7 or more, and the value of K_L is set to 0.3 or less.

Figure 14:
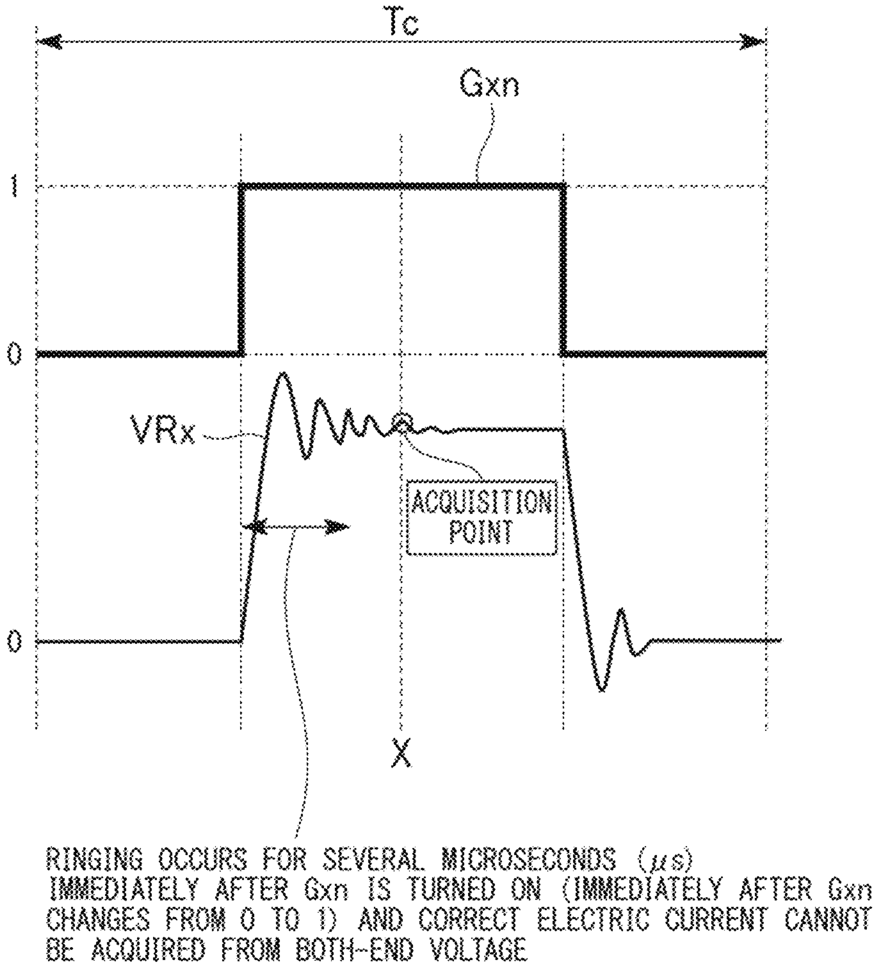
FIG. 14 is a graph showing an example of a waveform of a voltage between both ends of a shunt resistor in Embodiment 3.

Next, a process of preferably setting the first voltage threshold value m1 will be described. Gxn shown in FIG. 14 denotes an example of a waveform of any one of the switching signals Gun, Gvn, and Gwn in the lower arm-switching elements Sun, Svn, and Swn. Moreover, VRx denotes an example of a waveform of any one of the voltages VRu, VRv, and VRw between both ends of the shunt resistors Ru, Rv, and Rw. In the example shown in FIG. 14, after the signal Gxn changes from 0 to 1, ringing occurs in the voltage VRx between both ends of the shunt resistor for several microseconds (μs). Ringing is a phenomenon in which the voltage between both ends of the shunt resistor changes for a certain period of time when switching is performed in the inverter 12. If the electric current detector 22 acquires the pre-conversion detected electric currents ius, ivs, and iws based on the voltages VRu, VRv, and VRw between both ends of the shunt resistors including such ringing, an error may be contained in the detection result. If an error is contained in the pre-conversion detected electric currents ius, ivs, and iws, an error is also contained in the detected electric current values id and iq after coordinate conversion.

In order to accurately obtain the pre-conversion detected electric currents ius, ivs, and iws, the ON-time of the lower arm-switching elements Sun, Svn, and Swn corresponding thereto is preferably greater than a set time threshold value Tmin in accordance with the convergence time of the ringing. In order to make the ON-time of the lower arm-switching elements Sun, Svn, and Swn greater than the time threshold value Tmin, it is only necessary to set the voltage to be input to the PWM signal generator 27 to a value of Vdc×(Tc−Tmin)/Tc or less as indicated by the dash-dotted line of FIG. 2.

In FIG. 2, the corrected voltage commands vu', vv', and vw' (i.e., the voltage to be input to the PWM signal generator 27) are all Vdc×(Tc−Tmin)/Tc or less. Therefore, it is possible to eliminate errors due to ringing and to obtain the pre-conversion detected electric currents ius, ivs, and iws with high accuracy based on the voltages VRu, VRv, and VRw between both ends of the shunt resistors. In this way, a detection method of obtaining the pre-conversion detected electric currents ius, ivs, and iws based on the voltages VRu, VRv, and VRw between both ends of the shunt resistors corresponding to the three phases is referred to as "three-phase detection."

Figure 15:
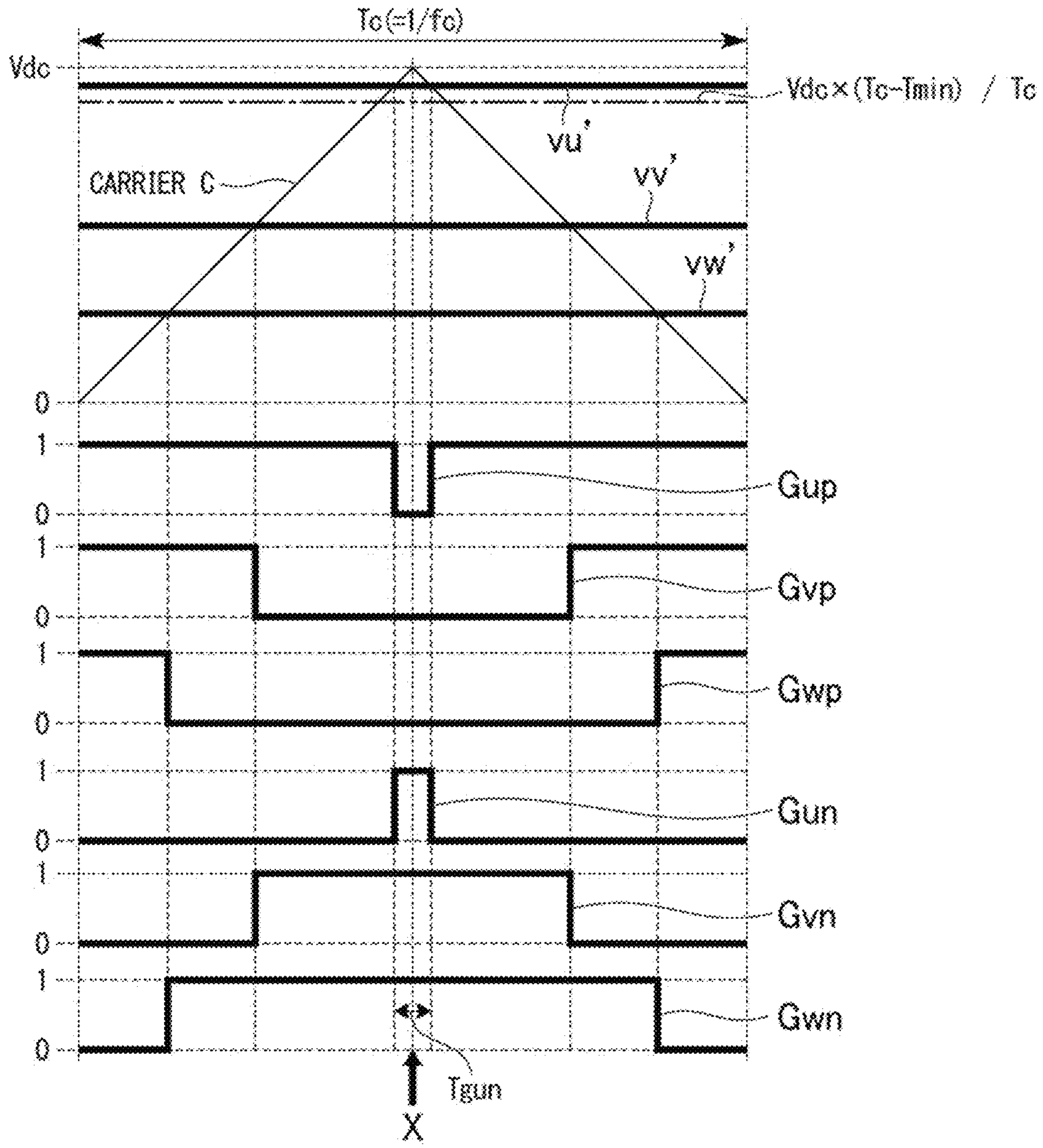
FIG. 15 is a diagram showing a case where a partial corrected voltage command value is greater than an upper limit value in Embodiment 3.

Meanwhile, when the voltage amplitude m increases due to an increase in the rotational speed of the rotating machine 10 or the like, some of the corrected voltage commands vu', vv', and vw' may take a large value close to the maximum value Vdc of the carrier triangle wave C. In the example of FIG. 15, the value of the corrected voltage command vu' is greater than the value of Vdc×(Tc−Tmin)/Tc (hereinafter also referred to as an "upper limit value"). In this case, a difference between the time when Gun is switched from 0 to 1 and the time at a timing X becomes small. Thus, the ringing effect is contained in the voltage VRu between both ends of the shunt resistor of the U-phase acquired at the timing X.

Therefore, the pre-conversion detected electric current for the phase in which the ON-time of the switching signals Gun, Gvn, and Gwn of the lower arm-switching elements is less than the time threshold value Tmin may be generated from the other two phases. In this way, a detection method of obtaining the pre-conversion detected electric current of one of the three phases based on the pre-conversion detected electric currents of the other two phases is referred to as "two-phase detection." For example, when the ON-time of the switching signal Gun is less than the time threshold value Tmin, the pre-conversion detected electric current ius of the U-phase may be calculated according to ius=−ivs−iws. Likewise, a calculation process may be performed as ivs=−ius−iws when the ON-time of the switching signal Gvn is less than the time threshold value Tmin, and a calculation process may be performed as iws=−ius−ivs when the ON-time of the switching signal Gwn is less than the time threshold value Tmin.

A relationship between the number of phases used for electric current detection and the voltage amplitude m is as follows. That is, when the voltage amplitude m is low and instantaneous values of the three-phase corrected voltage commands vu', vv', and vw' are all less than or equal to the upper limit value (Vdc×(Tc−Tmin)/Tc), "three-phase detection" is used. Alternatively, when the voltage amplitude m is high and the instantaneous value of any one of the three-phase corrected voltage commands vu', vv', and vw' is greater than or equal to the upper limit value (Vdc×(Tc−Tmin)/Tc), "two-phase detection" is used. Here, when "three-phase detection" and "two-phase detection" are compared, "three-phase detection" has higher accuracy. Therefore, in order to increase the control accuracy of the rotating machine 10, it is preferable to use "three-phase detection" as much as possible. However, from the viewpoint of increasing the output of the rotating machine 10, it may be preferable to increase the voltage amplitude m and to use "two-phase detection."

Therefore, in the present embodiment, the first voltage threshold value m1 is set to "(Tc−Tmin)/Tc." It can be said that "(Tc−Tmin)/Tc" is a numerical value standardized by dividing the aforementioned upper limit value of "Vdc×(Tc−Tmin)/Tc" by Vdc. By setting the first voltage threshold value m1 in this way, the following effects can be obtained. When the voltage amplitude m is greater than the first voltage threshold value m1, "two-phase detection" is used, and at this time, the proportional gains Kpd and Kpq are set to a low value Kp_L. Thereby, the effect of a decrease in the electric current detection accuracy can be reduced, and vibration and noise generated from the rotating machine 10 can be prevented from increasing. At the same time, the limit gain K is set to a high value K_H, so non-interference control is effective, and control stability is maintained. Moreover, when the voltage amplitude m is less than the first voltage threshold value m1, "three-phase detection" is used, and at this time, the proportional gains Kpd and Kpq are set to a large value Kp_H (see FIG. 13). Since the electric current detection accuracy is high in three-phase detection, the dependence on non-interference control is reduced. Thereby, the vibration and noise occurring in the rotating machine 10 due to the noise contained in the rotational angular velocity ω can be reduced.

It is only necessary to set the second voltage threshold value m2 to a value lower than the first voltage threshold value m1. However, if noise contained in the detected value of the rotational angular velocity ω is not problematic, it is not necessarily necessary to switch the value of the limit gain K at the second voltage threshold value m2. Specifically, if the voltage amplitude m is greater than or equal to the first voltage threshold value m1, the values of the proportional gains Kpd and Kpq are set to Kp_L, otherwise, the values of the proportional gains Kpd and Kpq are set to Kp_H, and the value of the limit gain K may be always set to a constant (K_H) regardless of the voltage amplitude m.

Moreover, in general AC rotating machines including the AC rotating machine 10 according to the present embodiment, the voltage applied to the rotating machine and the rotational speed (or the rotational angular velocity ω) of the rotating machine are approximately in a proportional relationship. Therefore, switching regarding the proportional gains Kpd and Kpq and the limit gain K may be performed using a threshold value related to the rotational speed (or the rotational angular velocity ω) instead of the threshold value related to the voltage amplitude m described above. For example, the rotational speed when the voltage amplitude m coincides with the first voltage threshold value m1 may be a first rotational speed threshold value n1, and the rotational speed when the voltage amplitude m coincides with the second voltage threshold value m2 may be a second rotational speed threshold value n2. In this case, the switching of the proportional gain Kpd or Kpq or the limit gain K based on the comparison between the voltage amplitude m and the threshold values m1 and m2 described above can be replaced with switching based on the comparison between the rotational speed and the threshold values n1 and n2. Similarly, the rotational angular velocity ω when the voltage amplitude m coincides with the first voltage threshold value m1 may be a first rotational angular velocity threshold value ω1, and the rotational angular velocity ω when the voltage amplitude m coincides with the second voltage threshold value m2 may be a second rotational angular velocity threshold value ω2. In this case, the switching of the proportional gain Kpd or Kpq or the limit gain K based on the comparison between the voltage amplitude m and the threshold values m1 and m2 described above can be replaced with switching based on the comparison between the rotational angular velocity w and the threshold values ω1 and ω2.

Alternatively, switching according to the voltage amplitude m and switching according to the rotational speed (or the rotational angular velocity ω) may be used together. As a specific example, switching of the proportional gains Kpd and Kpq may be performed based on the comparison between the voltage amplitude m and the first voltage threshold value m1, and switching of the limit gain K may be performed based on the comparison between the rotational speed (or the rotational angular velocity ω) and the second rotational speed threshold value n2 (or the second rotational angular velocity threshold value ω2).

The case where the values of the proportional gains Kpd and Kpq are switched based on the comparison between the voltage amplitude m and the first voltage threshold value m1, the comparison between the rotational speed and the first rotational speed threshold value n1, or the comparison between the rotational angular velocity ω and the first rotational angular velocity threshold value ω1 has been described above. However, for example, when the rotating machine electric current becomes excessive and exceeds the threshold value, the values of the proportional gains Kpd and Kpq may be fixed at Kp_H regardless of the voltage amplitude m or the rotational speed. When the rotating machine electric current is excessive, the state where the rotating machine electric current is excessive can be shortened by setting the proportional gains Kpd and Kpq to a large value. Thereby, failure of the control device of the rotating machine 10 can be prevented.

Moreover, when a part of the control device of the rotating machine 10 fails and the remaining parts that do not fail continue to operate, the proportional gains Kpd and Kpq may be always set to a large value (Kp_H) to improve system stability.

Moreover, when the values of the proportional gains Kpd and Kpq are switched between Kp_L and Kp_H, a slope (inclination) may be provided and be gradually switched such that the control is not discontinuous. Likewise, when the value of the limit gain K is switched between K_L and K_H, a slope (inclination) may be provided and be gradually switched.

As described above, in Embodiment 3, the first axis voltage command value calculator (for example, the d-axis voltage command value calculator **24*d*) calculates the voltage command value (for example, vd) of the first axis using a value obtained by multiplying the first deviation (for example, the d-axis electric current deviation ed) by the proportional gain (for example, Kpd). The proportional gain is switched between the first proportional value Kp_H and the second proportional value Kp_L less than the first proportional value Kp_H. Also, the proportional gain is set to the second proportional value Kp_L when the voltage amplitude m calculated based on the voltage command value is greater than or equal to the first voltage threshold value m1, when the rotational speed of the AC rotating machine 10 is greater than or equal to the first rotational speed threshold value n1, or when the rotational angular velocity ω of the AC rotating machine 10 is greater than or equal to the first rotational angular velocity threshold value ω1. According to this configuration, when the rotational angular velocity ω is large, by setting the proportional gain to a small value (Kp_L), the high-frequency noise component included in the first deviation can be reduced, and the control device 2 of the AC rotating machine 10** with low noise can be provided.

Moreover, in Embodiment 3, the first axis voltage command value calculator performs integral calculation using a value obtained by multiplying the second deviation by the limit gain K, and the limit gain K is switched between the first limit value K_H and the second limit value K_L smaller than the first limit value K_H. Also, when the voltage amplitude m is less than or equal to the second voltage threshold value m2 smaller than the first voltage threshold value m1, when the rotational speed of the AC rotating machine 10 is less than or equal to the second rotational speed threshold value n2 smaller than the first rotational speed threshold value n1, or when the rotational angular velocity ω of the AC rotating machine 10 is less than or equal to the second rotational angular velocity threshold value ω2 smaller than the first rotational angular velocity threshold value ω1, the limit gain K is set to the second limit value K_L. According to this configuration, when the rotational angular velocity ω is low, the input of the second deviation for the integral calculation can be limited to a small value by setting the limit gain to a small value (K_L).

For this reason, the high-frequency noise component included in the second deviation can be reduced, and the control device 2 of the AC rotating machine 10 with low noise can be provided.

Moreover, the inverter 12 includes the upper arm-switching elements Sup, Svp, and Swp, the lower arm-switching elements Sun, Svn, and Swn, and the shunt resistors Ru, Rv, and Rw corresponding to the three phases (U, V, and W). When the voltage amplitude m is smaller than the first voltage threshold value m1, the electric current detector 22 detects the rotating machine electric currents iu, iv, and iw of the three phases based on the voltages VRu, VRv, and VRw between both ends of the corresponding shunt resistors (i.e., "three-phase detection" is used). According to this configuration, it is possible to suppress the inclusion of errors due to the influence of ringing in the detection results of the rotating machine electric currents iu, iv, and iw. Therefore, it is possible to control the AC rotating machine 10 with high accuracy.

Moreover, when the rotating machine electric current exceeds the threshold value (i.e., when the rotating machine electric current is excessive), the proportional gains Kpd and Kpq may be set to the first proportional value Kp_H regardless of the voltage amplitude m or the like. In this case, it is possible to shorten the duration of the state in which the rotating machine electric current is excessive. Therefore, the failure of the control device 2 can be prevented.

Moreover, when a failure occurs in at least one location in the control device 2, the proportional gains Kpd and Kpq may be set to the first proportional value Kp_H regardless of the voltage amplitude m or the like. In this case, the system stability at the time of occurring the failure can be improved to suppress the occurrence of a secondary failure.

Embodiment 4

Next, Embodiment 4 will be described. In the present embodiment, a case where technology described in Embodiments 1 to 3 is applied to the control of a rotating machine included in an electric power-steering device will be described.

Figure 16:
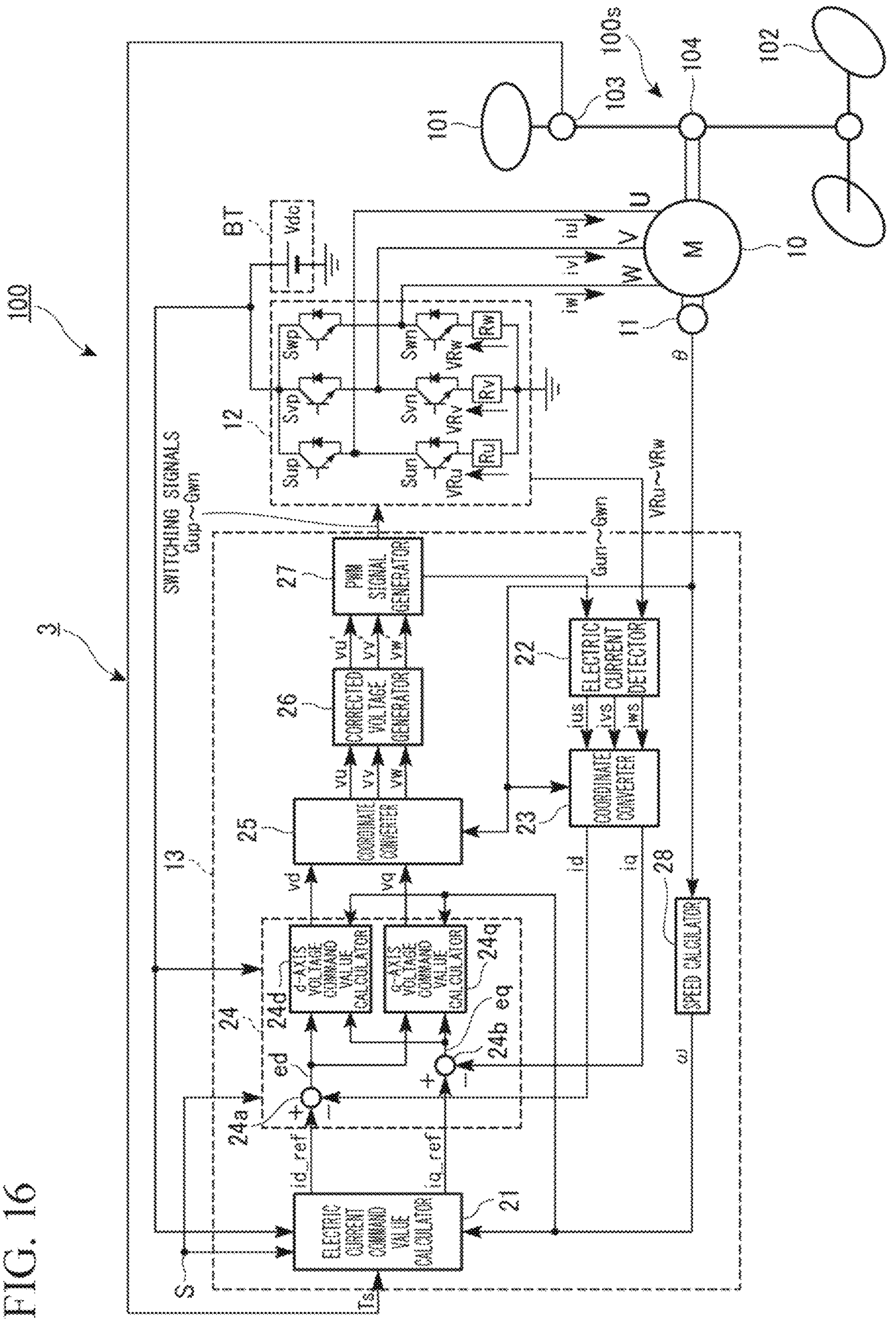
FIG. 16 is a block diagram showing a schematic configuration of an electric power-steering device according to Embodiment 4.

As shown in FIG. 16, an electric power-steering device 100 according to the present embodiment includes a control device 3, a steering wheel 101, a rotating machine 10, and a torque detector 103. The electric power-steering device 100 is mounted on a vehicle. The steering wheel 101 is operated by a driver. By operating the steering wheel 101, front wheels 102 of the vehicle are driven. Because the basic configuration of the control device 3 is similar to that of the control device 1 in Embodiment 1, detailed descriptions thereof will be omitted and differences will be mainly described.

The torque detector 103 detects steering torque Ts of the steering wheel 101 from the driver and outputs a detection result to the control device 3. A driving force of the rotating machine 10 is transmitted to a steering system 100*s* of the vehicle via a driving force transmission mechanism 104. The steering system 100*s* includes the steering wheel 101, the front wheels 102, and the like. The electric power-steering device 100 assists the driver in steering the vehicle by using the driving force generated by the rotating machine 10 as assist torque.

The electric current command value calculator 21 in the control device 3 performs a calculation related to a torque current command value (a q-axis electric current command value iq_ref) different from that in Embodiment 1, so this difference will be described. The steering torque Ts and a travel speed S of the vehicle are input to the electric current command value calculator 21, and the electric current command value calculator 21 calculates the q-axis electric current command value iq_ref based on these inputs.

Figure 17:
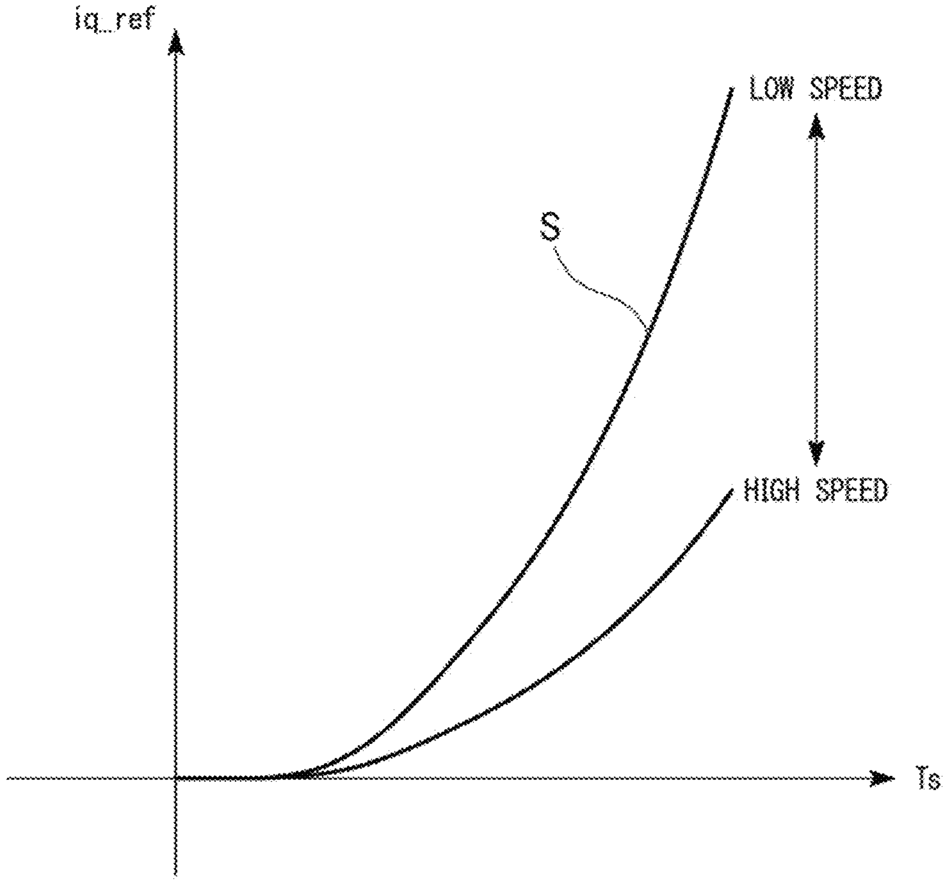
FIG. 17 is a graph showing a relationship between steering torque, a q-axis electric current command value, and a vehicle speed in Embodiment 4.

FIG. 17 is a graph showing a set value of the q-axis electric current command value iq_ref according to the steering torque Ts and the travel speed S of the vehicle. As shown in this graph, as the steering torque Ts increases, the value of the electric current command value iq_ref increases, and the gradient of the change thereof increases. Moreover, as the travel speed S of the vehicle increases, the value of the electric current command value iq_ref decreases. In addition, the value of the electric current command value iq_ref may be determined by further taking the damping torque obtained based on the rotational angular velocity ω or the like into consideration.

As shown in FIG. 17, as the travel speed S of the vehicle decreases, the gradient of the q-axis electric current command value iq_ref increases with respect to the steering torque Ts. As a result, when detection noise is included in the steering torque Ts, the influence thereof on the q-axis electric current command value iq_ref increases, resulting in the generation of vibration and noise from the rotating machine 10, discomfort to the touch of the steering wheel 101, or the like.

Figure 18:
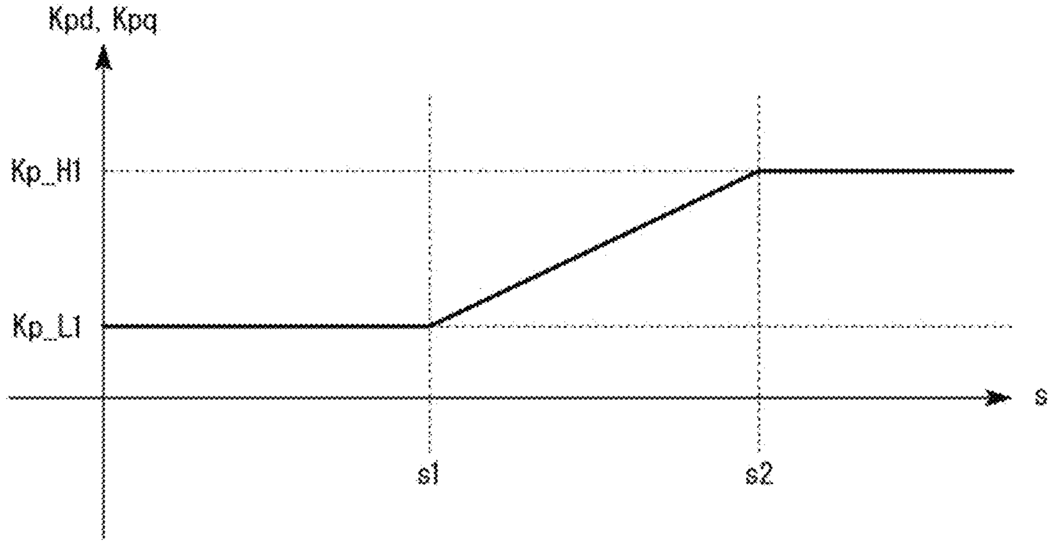
FIG. 18 is a diagram showing a relationship between the vehicle speed and a proportional gain in Embodiment 4.

Therefore, in the voltage command value calculation unit 24 in Embodiment 4, the proportional gain Kpd in the d-axis voltage command value calculator 24*d* and the proportional gain Kpq in the q-axis voltage command value calculator 24*q* are changed according to the travel speed S of the vehicle as shown in FIG. 18. "Kp_H1" is referred to as a first velocity reference value and "Kp_L1" is referred to as a second velocity reference value. The second velocity reference value Kp_L1 is smaller than the first velocity reference value Kp_H1.

When the travel speed S of the vehicle is less than or equal to s1, the values of the proportional gains Kpd and Kpq are set to Kp_L1. Thus, it is possible to suppress the sensitive reaction of the q-axis electric current command value iq_ref to the pulsation of the steering torque Ts by setting the proportional gains Kpd and Kpq to be low. Moreover, when the travel speed S of the vehicle is s2 or more, the influence of the pulsation of the steering torque Ts on the q-axis electric current command value iq_ref is small, and therefore the proportional gains Kpd and Kpq are set to a high value Kp_H1. Thus, it is possible to provide an electric power-steering device in which the occurrence of vibration and abnormal noise of the rotating machine 10 due to noise included in the detected steering torque value or the discomfort that the driver feels from the steering wheel 101 is suppressed by switching the proportional gains Kpd and Kpq in accordance with the travel speed S of the vehicle.

As shown in FIG. 18, when the travel speed S of the vehicle is within the range of s1 to s2, the values of the proportional gains Kpd and Kpq are continuously changed within the range of Kp_H1 to Kp_L1. Thereby, it is possible to suppress the discomfort or the like that the driver feels due to rapidly switching the set values of the proportional gains Kpd and Kpq. The proportional gains Kpd and Kpq may be switched stepwise between Kp_H1 and Kp_L1.

As described above, the electric power-steering device 100 according to the present embodiment includes the control device 3, the AC rotating machine 10, and the driving force transmission mechanism 104 configured to transmit the driving force of the AC rotating machine 10 to the steering system 100*s* of the vehicle. According to such a configuration, the electric power-steering device 100 having both quietness and steering stability can be provided.

Moreover, in the present embodiment, the proportional gains Kpd and Kpq are switched between the first velocity reference value Kp_H1 and the second velocity reference value Kp_L1 smaller than the first velocity reference value Kp_H1. When the travel speed S of the vehicle is smaller than the threshold value s2, the voltage command value calculation unit 24 sets the proportional gains Kpd and Kpq to a value smaller than the first velocity reference value Kp_H1. According to this configuration, quietness can be improved even in situations where the vehicle speed is low and steering noise is likely to be echoed.

Embodiment 5

Figure 19:
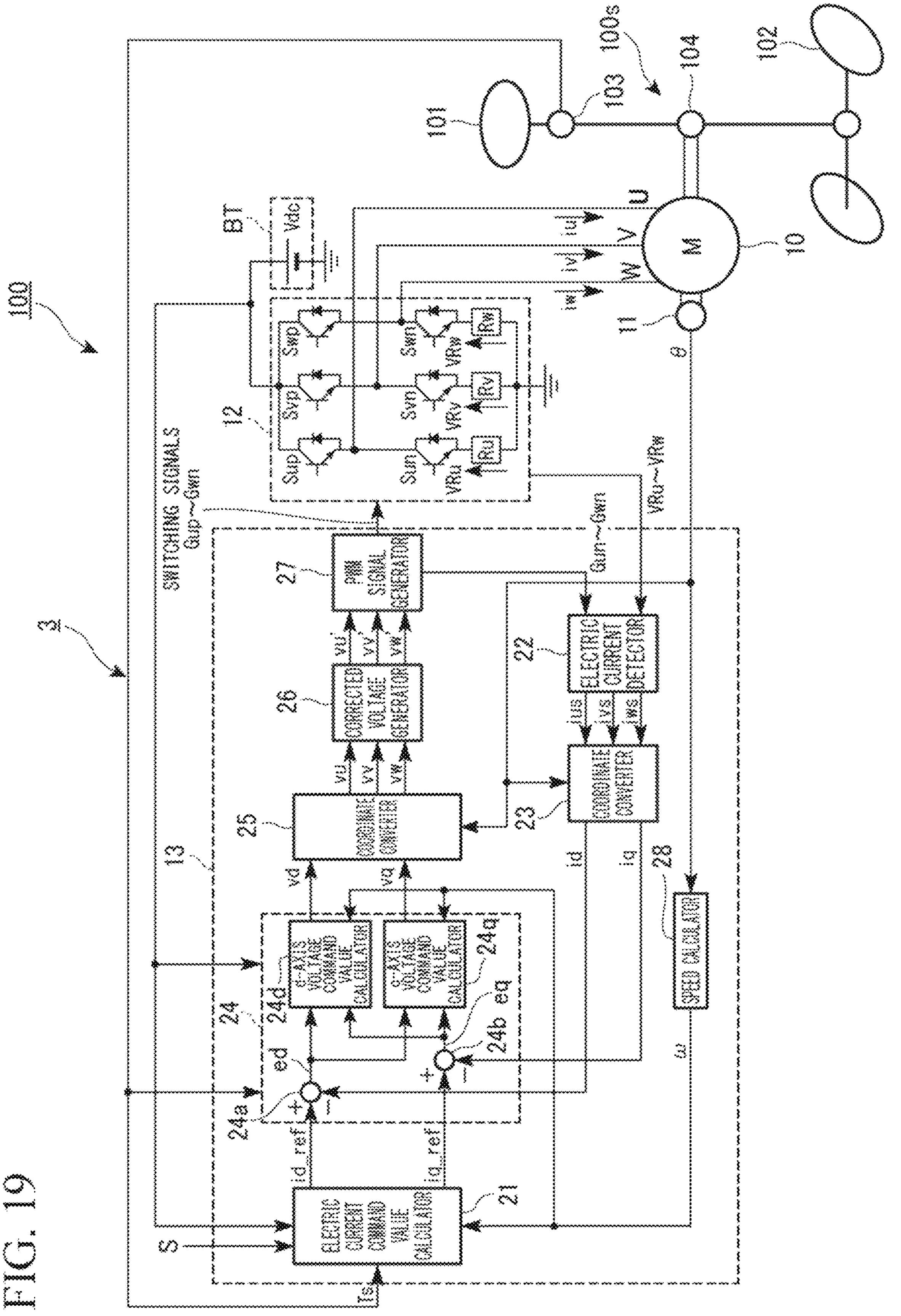
FIG. 19 is a block diagram showing a schematic configuration of an electric power-steering device according to Embodiment 5.

Next, Embodiment 5 will be described. As shown in FIG. 19, an electric power-steering device 100 according to the present embodiment includes a control device 3 similar to that of Embodiment 4. The technology of Embodiment 5 is different from the technology described in Embodiment 4 in that a detected value to be input to the voltage command value calculation unit 24 is changed from a travel speed S of a vehicle to steering torque Ts, and that a part of calculation content in the voltage command value calculation unit 24 is different. The others are similar to those of Embodiment 4, so descriptions thereof will be omitted.

In FIG. 17 described in Embodiment 4, in each state where the travel speed S of the vehicle is low or high, as the steering torque Ts decreases, the inclination of the q-axis electric current command value iq_ref with respect to the steering torque Ts decreases. That is, a margin in steering stability increases as the steering torque Ts decreases, so there is room to reduce the limit gain K described in Embodiment 3. Therefore, in the voltage command value calculation unit 24 according to Embodiment 5, the limit gain K is changed as shown in FIG. 20.

Figure 20:
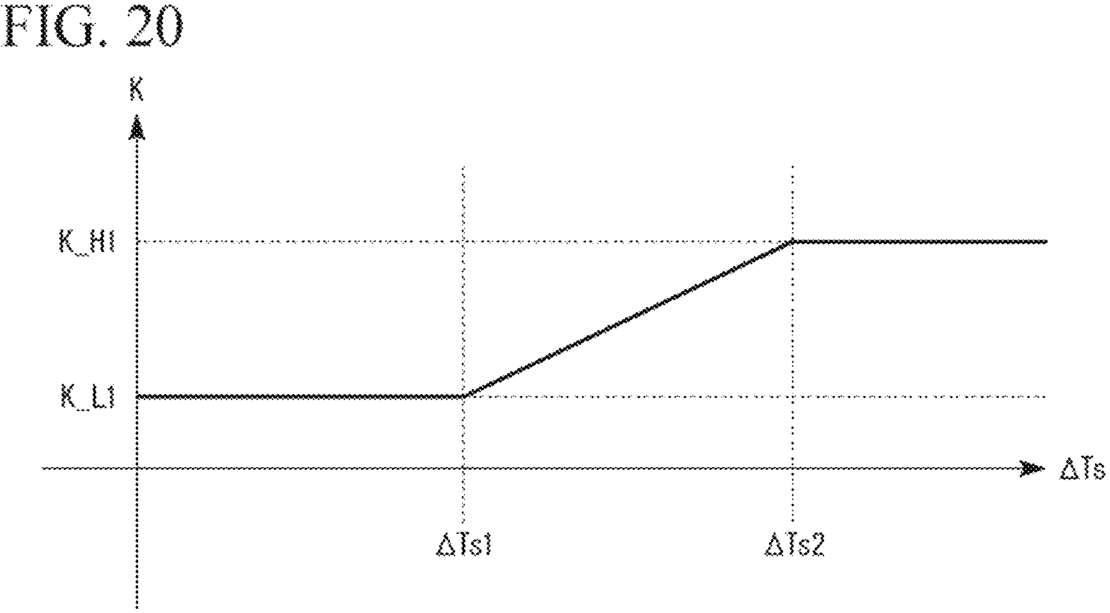
FIG. 20 is a graph showing a relationship between an amount of change in steering torque and a limit gain in Embodiment 5.

In FIG. 20, "ΔTs" denotes an amount of change per unit time of the steering torque Ts, "K_H1" denotes a first torque reference value, and "K_L1" denotes a second torque reference value. The second torque reference value K_L1 is smaller than the first torque reference value K_H1. The limit gain K changes in the range of K_L1 to K_H1 in accordance with the magnitude of the amount of change ΔTs. Specifically, when ΔTs is less than or equal to the first torque threshold value ΔTs1, the value of the limit gain K is set to K_L1. When ΔTs is greater than or equal to the second torque threshold value ΔTs2, the value of the limit gain K is set to K_H1. When ΔTs is in the range of ΔTs1 to ΔTs2, the value of the limit gain K continuously changes within the range of K_L1 to K_H1. Thereby, it is possible to reduce the vibration and noise of the rotating machine 10 in a region where the change in the steering torque Ts is small.

In FIG. 20, the horizontal axis represents ΔTs. However, a similar effect can be obtained even if the horizontal axis represents the gradient (Δiq_ref/ΔTs) of the graph of FIG. 17. The above-described gradient (Δiq_ref/ΔTs) is referred to as an "electric current torque gradient" in the present specification. That is, the electric current torque gradient is a ratio of an amount of change (Δiq_ref) in the q-axis electric current command value iq_ref to an amount of change (ΔTs) in the steering torque Ts. When the electric current torque gradient is less than the threshold value, the proportional gains Kpd and Kpq may be set to a small value Kp_L1. Moreover, when at least one of the electric current command values iq_ref and id_ref is smaller than the threshold value or when the steering torque Ts is less than the threshold value, the proportional gains Kpd and Kpq may be set to a small value (for example, Kp_L1).

When the steering torque Ts or the electric current command values iq_ref and the id_ref are small, the steering noise is more noticeable. Therefore, Embodiment 5 proposes a configuration in which the proportional gains Kpd and Kpq are set to values lower than the first velocity reference value Kp_H1 when the electric current command values iq_ref and the id_ref are less than or equal to the threshold value, when a gradient (an electric current torque gradient Δiq_ref/ΔTs) in a graph representing the relationship between the steering torque Ts and the torque current command value iq_ref is smaller than the threshold value, or when the amount of change ΔTs per unit time of the steering torque Ts is smaller than the first torque threshold value ΔTs1. Thereby, in a situation where the steering noise is likely to be noticeable, the non-interference control can be weakened to ensure quietness.

In Embodiments 4 and 5, instead of inputting the rotational angular velocity ω to the inductance amplifiers 106*d* and 106*q* in accordance with non-interference control, a result of the rotational angular velocity ω passing through a low-pass filter may be input thereto. The cut-off frequency of the low-pass filter is preferably greater than the upper limit value (for example, 5 Hz) of the steering frequency of the electric power-steering device 100. In this case, an effect of reducing the abnormal noise and vibration of the rotating machine 10 caused by the noise component contained in the rotational angular velocity ω by introducing non-interference control is obtained. Therefore, a quiet electric power-steering device 100 can be provided.

While Embodiments 1 to 5 have been described above, the present disclosure is not limited to the above-described embodiments and can be freely changed within the scope of the present disclosure. Moreover, the above-described Embodiments 1 to 5 can be appropriately combined.

Each constituent element provided in the control devices 1 to 3 of the rotating machine and the electric power-steering device 100 described above has a computer system therein. Also, the process in each constituent element provided in the control devices 1 to 3 of the rotating machine and the electric power-steering device 100 described above may be carried out by recording a program for implementing the function of each constituent element provided in the control devices 1 to 3 of the rotating machine and the electric power-steering device 100 described above on a computer-readable recording medium, and by reading the program recorded on the recording medium into the computer system to execute the program. Here, "reading the program recorded on the recording medium into the computer system to execute the program" includes installing the program in the computer system. The term "computer system" as used herein includes an operating system (OS) and hardware such as peripheral devices.

Moreover, the "computer system" may include a plurality of computer devices connected together via networks including the Internet, a WAN, a LAN, and communication lines such as a dedicated line. Moreover, "the computer-readable recording medium" refers to a flexible disk, a magneto-optical disk, a ROM, a portable medium such as a CD-ROM, or a storage device such as a hard disk provided inside the computer system. Thus, the recording medium storing a program may be a non-transient recording medium such as a CD-ROM.

Moreover, the recording medium also includes an internally or externally provided recording medium that can be accessed from a distribution server to distribute the program.

The program may be divided into a plurality of segments, which are downloaded at different timings and then combined in each constituent element provided in the control devices 1 to 3 of the rotating machine and the electric power-steering device 100, or the distribution servers for distributing the segments of the divided program may be different. Furthermore, "the computer-readable recording medium" also includes one that retains a program for a predetermined period of time such as a volatile memory (RAM) inside a computer system that acts as a server or a client when a program is sent via a network. Moreover, the above-described program may be for implementing a part of the above-described functions. Furthermore, the above-described program may be a so-called difference file (difference program), which can implement the above-described functions in combination with a program already recorded in the computer system.

REFERENCE SIGNS LIST

1 to 3 Control device
10 AC rotating machine
12 Inverter
22 Electric current detector
24*d*, 24*q* First axis voltage command value calculator, second axis voltage command value calculator
100 Electric power-steering device
104 Driving force transmission mechanism
E1, E2*d* Gain changer
id, iq Detected electric current value
id_ref, iq_ref Electric current command value
iq_ref Torque current command value
iu, iv, iw Rotating machine electric current
K Limit gain
Kd Gain
K_H First limit value
K_L Second limit value
Kp_H First proportional value
Kp_H1 First velocity reference value
Kp_L Second proportional value
Kp_L1 Second velocity reference value
Kpd, Kpq Proportional gain
Ld d-axis inductance
m Voltage amplitude
m1 First voltage threshold value
m2 Second voltage threshold value
n1 First rotational speed threshold value
n2 Second rotational speed threshold value
Ru, Rv, Rw Shunt resistor
S Travel speed
100*s* Steering system of vehicle
Sun, Svn, Swn Lower arm-switching element
Sup, Svp, Swp Upper arm-switching element
Ts Steering torque
vd, vq First axis voltage command value, second axis voltage command value
VRu, VRv, VRw Voltage between both ends
vu, vv, vw Voltage command value
ΔTs Amount of change in steering torque
ω Rotational angular velocity
ω1 First rotational angular velocity threshold value
ω2 Second rotational angular velocity threshold value
ωcc Response angular frequency

The invention claimed is:

1. A control device for an AC rotating machine, comprising:

an inverter configured to apply a voltage to the AC rotating machine;

an electric current detector configured to detect a rotating machine electric current flowing through the AC rotating machine;

a first axis voltage command value calculator configured to calculate a voltage command value of a first axis between two rotational axes of the AC rotating machine; and a second axis voltage command value calculator configured to calculate a voltage command value of a second axis between the two rotational axes, wherein the first axis voltage command value calculator includes a gain changer configured to change a set value of a gain based on a detected electric current value of the first axis or a first deviation that is a deviation between an electric current command value of the first axis and the detected electric current value of the first axis, and wherein the first axis voltage command value calculator performs integral calculation using an integral input calculated based on the gain and a second deviation that is a deviation between an electric current command value of the second axis and a detected electric current value of the second axis and calculates the voltage command value of the first axis based on a result of the integral calculation.

2. The control device for an AC rotating machine according to claim 1, wherein the AC rotating machine is a permanent magnet synchronous rotating machine, wherein the first axis is a d-axis that connects a central axis of a rotor and a magnetic pole in the AC rotating machine, and wherein the gain changer decreases the set value of the gain when a d-axis electric current deviation that is a deviation between an electric current command value of the d-axis and a detected electric current value of the d-axis exceeds a deviation threshold value or when the detected electric current value of the d-axis exceeds an electric current threshold value to a negative side.

3. The control device for an AC rotating machine according to claim 2, wherein the gain changer sets the set value of the gain to zero when the d-axis electric current deviation exceeds the deviation threshold value or when the detected electric current value of the d-axis exceeds the electric current threshold value to the negative side.

4. The control device for an AC rotating machine according to claim 1, wherein the first axis voltage command value calculator executes the integral calculation using a value obtained by multiplying the second deviation by a rotational angular velocity of the AC rotating machine, an inductance of the second axis, and a response angular frequency for adjusting a frequency response of the rotating machine electric current to the electric current command value.

5. The control device for an AC rotating machine according to claim 1, wherein the first axis voltage command value calculator calculates the voltage command value of the first axis using a value obtained by multiplying, by a proportional gain, the first deviation that is the deviation between the electric current command value of the first axis and the detected electric current value of the first axis of the rotating machine electric current, wherein the proportional gain is switched between a first proportional value and a second proportional value less than the first proportional value, and wherein the proportional gain is set to the second proportional value when a voltage amplitude calculated based on the voltage command value is greater than or equal to a first voltage threshold value, when a rotational speed of the AC rotating machine is greater than or equal to a first rotational speed threshold value, or when a rotational angular velocity of the AC rotating machine is greater than or equal to a first rotational angular velocity threshold value.

6. The control device for an AC rotating machine according to claim 5, wherein the first axis voltage command value calculator executes the integral calculation using a value obtained by multiplying the second deviation by a limit gain, wherein the limit gain is switched between a first limit value and a second limit value less than the first limit value, and wherein the limit gain is set to the second limit value when the voltage amplitude is less than or equal to a second voltage threshold value less than the first voltage threshold value, when the rotational speed of the AC rotating machine is less than or equal to a second rotational speed threshold value less than the first rotational speed threshold value, or when the rotational angular velocity of the AC rotating machine is less than or equal to a second rotational angular velocity threshold value less than the first rotational angular velocity threshold value.

7. The control device for an AC rotating machine according to claim 5, wherein the inverter includes three sets corresponding to three phases, each of the three sets including an upper arm-switching element, a lower arm-switching element, and a shunt resistor, and wherein the electric current detector detects the rotating machine electric current of each of the three phases based on a voltage between both ends of the shunt resistor corresponding thereto when the voltage amplitude is less than the first voltage threshold value.

8. The control device for an AC rotating machine according to claim 5, wherein the first axis voltage command value calculator sets the proportional gain to the first proportional value when the rotating machine electric current exceeds a threshold value.

9. The control device for an AC rotating machine according to claim 5, wherein the first axis voltage command value calculator sets the proportional gain to the first proportional value when a failure has occurred in at least one location in the control device for the AC rotating machine.

10. An electric power-steering device, comprising:

the control device for an AC rotating machine according to claim 1;

the AC rotating machine; and a driving force transmission mechanism configured to transmit a driving force of the AC rotating machine to a steering system of a vehicle.

11. The electric power-steering device according to claim 10, wherein the first axis voltage command value calculator calculates the voltage command value of the first axis using a value obtained by multiplying the first deviation by a proportional gain, wherein the proportional gain is switched between a first velocity reference value and a second velocity reference value less than the first velocity reference value, and wherein the first axis voltage command value calculator sets the proportional gain to a value less than the first velocity reference value when a travel speed of the vehicle is less than a threshold value.

12. The electric power-steering device according to claim 11, wherein the first axis voltage command value calculator sets the proportional gain to a value less than the first velocity reference value when the electric current command value is less than or equal to a threshold value, when steering torque is less than or equal to a threshold value, when a gradient in a graph indicating a relationship between the steering torque and a torque current command value is less than a threshold value, or when an amount of change per unit time of the steering torque is less than a threshold value.

13. The electric power-steering device according to claim 10, wherein the first axis voltage command value calculator executes the integral calculation using a result when a rotational angular velocity of the AC rotating machine passes through a low-pass filter whose cutoff frequency is higher than an upper limit value of a steering frequency of the electric power-steering device.

* * * * *